United States Patent
Zhang et al.

(10) Patent No.: US 11,690,049 B2
(45) Date of Patent: *Jun. 27, 2023

(54) METHOD AND APPARATUS FOR SELECTING RESOURCES IN V2X COMMUNICATIONS

(71) Applicant: Samsung Electronics Co., Ltd., Suwon-si (KR)

(72) Inventors: Shichang Zhang, Beijing (CN); Yi Wang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,682

(22) Filed: Nov. 22, 2021

(65) Prior Publication Data

US 2022/0086805 A1 Mar. 17, 2022

Related U.S. Application Data

(63) Continuation of application No. 16/324,534, filed as application No. PCT/KR2017/008709 on Aug. 10, 2017, now Pat. No. 11,197,269.

(30) Foreign Application Priority Data

Aug. 10, 2016 (CN) .......................... 201610649489.4
Aug. 11, 2016 (CN) .......................... 201610657551.4

(Continued)

(51) Int. Cl.
H04W 72/02 (2009.01)
H04W 4/40 (2018.01)
(Continued)

(52) U.S. Cl.
CPC ............ *H04W 72/02* (2013.01); *H04W 4/40* (2018.02); *H04W 72/23* (2023.01);
(Continued)

(58) Field of Classification Search
CPC ..... H04W 72/02; H04W 4/40; H04W 72/042; H04W 72/085; H04W 74/006;
(Continued)

(56) References Cited

U.S. PATENT DOCUMENTS

2015/0334760 A1 11/2015 Sartori et al.
2016/0044665 A1 2/2016 Novlan et al.
(Continued)

FOREIGN PATENT DOCUMENTS

CN 106060947 A 10/2016
KR 10-2016-0055072 A 5/2016
(Continued)

OTHER PUBLICATIONS

International Search Report dated Oct. 20, 2017 in connection with International Patent Application No. PCT/KR2017/008709, 4 pages.
(Continued)

*Primary Examiner* — Mewale A Ambaye

(57) ABSTRACT

The present disclosure provides a method for determining a resource of a communication by a terminal in a wireless communication system, the method comprising: receiving, from a base station, information on a minimum number of subframes for monitoring; determining a number of a plurality of subframes to be monitored based on the minimum number of subframes; identifying the plurality of subframes to be monitored for a sidelink transmission; and transmitting, to the base station, information indicating a set of subframes for the sidelink transmission selected based on the plurality of subframes.

8 Claims, 18 Drawing Sheets

(30) Foreign Application Priority Data

| Aug. 18, 2016 | (CN) | 201610687111.3 |
|---|---|---|
| Sep. 12, 2016 | (CN) | 201610819468.2 |
| Nov. 4, 2016 | (CN) | 201610974836.0 |
| Jan. 24, 2017 | (CN) | 201710060123.8 |

(51) Int. Cl.
| *H04W 74/00* | (2009.01) |
| *H04W 74/08* | (2009.01) |
| *H04W 72/23* | (2023.01) |
| *H04W 72/542* | (2023.01) |
| *H04W 92/18* | (2009.01) |

(52) U.S. Cl.
CPC ....... *H04W 72/542* (2023.01); *H04W 74/006* (2013.01); *H04W 74/0808* (2013.01); *H04W 92/18* (2013.01)

(58) Field of Classification Search
CPC . H04W 74/0808; H04W 92/18; H04W 72/12; H04W 74/0816
See application file for complete search history.

(56) References Cited

U.S. PATENT DOCUMENTS

| 2016/0295624 | A1* | 10/2016 | Novlan | H04L 67/12 |
| 2016/0337841 | A1 | 11/2016 | Won et al. | |
| 2017/0118748 | A1* | 4/2017 | Kalhan | H04W 72/02 |
| 2017/0230937 | A1* | 8/2017 | Nguyen | H04W 88/06 |
| 2017/0332390 | A1 | 11/2017 | Li et al. | |
| 2018/0176892 | A1 | 6/2018 | Kim et al. | |
| 2018/0249462 | A1 | 8/2018 | Blasco Serrano et al. | |
| 2018/0323935 | A1 | 11/2018 | Yerramalli et al. | |
| 2019/0116475 | A1 | 4/2019 | Lee et al. | |
| 2019/0182890 | A1* | 6/2019 | Jeong | H04W 72/20 |
| 2019/0191442 | A1* | 6/2019 | Lu | H04W 36/06 |
| 2019/0191461 | A1 | 6/2019 | Lee et al. | |
| 2019/0268915 | A1 | 8/2019 | Li et al. | |
| 2019/0320475 | A1* | 10/2019 | Li | H04W 8/005 |
| 2019/0327012 | A1 | 10/2019 | Park et al. | |
| 2020/0037358 | A1 | 1/2020 | Chae et al. | |
| 2020/0068531 | A1 | 2/2020 | Sundberg et al. | |
| 2020/0229171 | A1 | 7/2020 | Khoryaev et al. | |
| 2020/0245327 | A1 | 7/2020 | Tang | |
| 2020/0296692 | A1 | 9/2020 | Lee et al. | |

FOREIGN PATENT DOCUMENTS

| WO | 2015/152581 A1 | 10/2015 |
| WO | 2015/178851 A1 | 11/2015 |

OTHER PUBLICATIONS

Written Opinion of the International Searching Authority dated Oct. 20, 2017 in connection with International Patent Application No. PCT/KR2017/008709, 7 pages.

NTT Docomo, Inc, "Further detail of partial sensing for P2V operation", 3GPP TSG RAN WG1 Meeting #85, May 23-27, 2016, 3 pages, R1-165208.

Samsung, "UE procedure after sensing in UE autonomous resource selection", 3GPP TSG RAN WG1 Meeting #85, May 23-27, 2016, 10 pages, R1-164759.

LG Electronics, "Discussion on details of sensing operation for PC5 based V2V", 3GPP TSG RAN WG1 Meeting #85, May 23-27, 2016, 5 pages, R1-164510.

Intel Corporation, "Utilization of PSCCH Decoding and Energy Measurements for Sensing Based V2V Communication", May 23-27, 2016, 5 pages, R1-164136.

NTT Docomo, "Discussion on details of sensing with semi-persistent transmission", 3GPP TSG RAN WG1 Meeting #84bis, Apr. 11-15, 2016, 6 pages, R1-163176.

Supplementary European Search Report dated Apr. 15, 2019 in connection with European Patent Application No. 17 83 9842, 11 pages.

NTT Docomo, Inc., "Evaluation and discussion on resource selection for pedestrian UEs", 3GPP TSG RAN WG1 Meeting #86, Aug. 22-26, 2016, R1-167886, 6 pages.

Ericsson, "Discussion on Sidelink Operations for Pedestrian", 3GPP TSG-RAN WG2 #95bis, Oct. 10-14, 2016, Tdoc R2-166967, 4 pages.

NTT Docomo, Inc., "Discussion on PC5-based V2P operation", 3GPP TSG RAN WG1 Meeting #84bis, Apr. 11-15, 2016, R1-163184, 3 pages.

Office Action dated Sep. 16, 2021 in connection with Chinese Patent Application No. 201710060123.8, 10 pages.

Huawei et al., "Discussion on group priority for D2D communication", 3GPP TSG RAN WG1 Meeting #82, Aug. 24-28, 2015, R1-154339, 4 pages.

Office Action dated Aug. 17, 2022 in connection with Chinese Patent Application No. 201610819468.2, 13 pages.

Office Action dated Nov. 15, 2022 in connection with Chinese Patent Application No. 201610657551.4, 14 pages.

\* cited by examiner

METHOD AND APPARATUS FOR SELECTING RESOURCES IN V2X COMMUNICATIONS

CROSS-REFERENCE TO RELATED APPLICATIONS

This application is a continuation of U.S. patent application Ser. No. 16/324,534 filed on Feb. 8, 2019, which is a 371 of International Application No. PCT/KR2017/008709 filed on Aug. 10, 2017, which claims priority to Chinese Patent Application No. 201610649489.4 filed on Aug. 10, 2016, Chinese Patent Application No. 201610657551.4 filed on Aug. 11, 2016, Chinese Patent Application No. 201610687111.3 filed on Aug. 18, 2016, Chinese Patent Application No. 201610819468.2 filed on Sep. 12, 2016, Chinese Patent Application No. 201610974836.0 filed on Nov. 4, 2016, and Chinese Patent Application No. 201710060123.8 filed on Jan. 24, 2017, the disclosures of which are herein incorporated by reference in their entirety.

BACKGROUND

The present disclosure relates to the technical field of mobile communications and in particular to a method and apparatus for selecting resources in V2X (Vehicle to Vehicle/Pedestrian/Infrastructure/Network) information exchanging communications.

1. Field

At present, the device-to-device (D2D) communication technology has been accepted by the 3GPP (3rd Generation Partnership Project) standard and some functions of the D2D communication technology have been standardized in the 3GPP Release-12 and Release-13 standards by virtue of its great potential value in the field of public safety and common civil communications. Currently the 3GPP Rel-12 standard defines two modes of D2D broadcast communication, referred to as Mode 1 and Mode 2.

2. Description of Related Art

The Mode 1 requires that a UE (User Equipment) transmitting a D2D broadcast communication must be located under the coverage of a cellular network (ICUE: In Coverage UE). The UE acquires configuration information of a PSCCH (Physical Sidelink Control CHannel) resource pool of the Mode 1 by receiving system broadcast signaling from an eNB. Configuration information includes a PSCCH period, a subframe position for PSCCH transmission in each PSCCH period, and positions of physical resource blocks (PRBs) for PSCCH transmission in each subframe. The UE detects a sidelink grant sent from the eNB before each PSCCH period, and acquires positions of resources to transmit PSCCH and PSSCH (Physical Sidelink Shared CHannel) in the PSCCH period. In the Mode 1, through the centralized control by the eNB, resource collision between different UEs may be avoided.

A UE that transmits a D2D broadcast communication via the Mode 2 may be located within the coverage of a cellular network (i.e., ICUE) or may be a UE located outside the coverage of a cellular network (i.e., Out of Coverage UE, OCUE). In the former case, the UE acquires configuration information of a PSCCH resource pool and configuration information of a corresponding PSSCH resource pool of the Mode 2 by receiving system broadcast signaling from an eNB, where the PSSCH resource pool includes a subframe position for PSSCH transmission in a corresponding PSCCH period and positions of physical resource blocks for PSSCH transmission in each subframe. In each PSCCH period, the UE randomly selects PSCCH and corresponding PSSCH transmission resources. In the latter case, the UE determines configuration information of the PSCCH resource pool and configuration information of the corresponding PSSCH resource pool of the mode 2 according to pre-configuration information, and selects resources in the same manner with that in the former case. In a typical D2D communication environment, the number of UEs which perform D2D communications in each cell is 3. Therefore, the issues of resource collision and IBE (In-band Emission) caused by a random resource selection mode are not optimized during formulation of the 3GPP standards.

Because a standardized D2D communication in the 3GPP Rel-12 standard is mainly for low-speed UEs and services with low latency sensitivity and low receiving reliability, thus, the D2D functions realized are far from meeting the demands of users. In the subsequent respective 3GPP versions, to further enhance the D2D functional framework is a common understanding of various communication UE manufacturers and communication network equipment manufacturers. Among them, based on the current D2D broadcast communication mechanism to support the direct low-delay-and-high-reliability communication between high-speed devices, between a high-speed device and a low-speed device, and between a high-speed device and a stationary device, i.e., V2X (Vehicle to Vehicle/Pedestrian/Infrastructure/Network) is one of the functions to be standardized preferentially.

Compared to the traditional D2D communications, one of the main features of V2X communication is the higher UE transmission density. For example, in a downtown traffic jam environment (the average speed of vehicles is 15 km/h), the number of vehicles per square kilometer may reach 2,400. According to the V2X communication service model as prescribed by the ETSI (European Telecommunication Standards Institute), the vehicles may generate one V2X packet approximately every one second. In general, a message needs to be sent out within 100 ms after generated. Therefore, it can be seen that the UE transmission density of the V2X communication is far larger than that of the D2D communication. According to the conclusion of the current 3GPP standards, the V2X communication will follow the Mode 2 mode defined for the D2D communication. That is, a transmission UE may autonomously select a resource in a resource pool. However, a significant increase in the density of transmission UEs causes the transmission UEs cannot use the random resource selection mode as that in the D2D mode 2, or otherwise, the resulting resource collision and IBE will seriously affect the performance of V2X communications. For this issue, the 3GPP standards agree to introduce a channel sensing mechanism in V2X communications. According to the channel sensing mechanism, a V2X UE will detect interference levels in candidate resources, and select a resource, interference level of which satisfies a corresponding condition when performing autonomous resource selection.

According to the present 3GPP conclusion, a V2X UE should perform channel sensing in a currently selected resource pool. If the V2X UE performs resource selection in a subframe n, the UE predicts available resources following the subframe n according to a channel sensing result within a time range [n−a, n−b], where a−b should be no less than 1 s, so as to obtain resource occupancy information accurate enough, which requires the V2X UE to perform continuous channel sensing. However, there are some UEs with limited power endurance in the V2X communication environment. For example, in a P2V (Pedestrian to Vehicle) case, UEs that send data are terminal devices hold by pedestrians, which is different from that in vehicles. This type of UEs cannot afford the power consumption caused by long-term channel sensing. In the following, this type of UEs with restricted power is called P-UE. In order to reduce the power loss of the P-UE, the 3GPP standard determines that the P-UE may select a resource though two resource selection modes, i.e., a mode of randomly selecting transmission resource(s) (RM) and a mode of selecting transmission resource(s) based on partial sensing (PS). A UE performing partial channel sensing should detect signals transmitted by other terminals in Y subframes every X subframes, where Y≤X, for example, X=100, Y=10. Despite this, the random resource selection mode cannot avoid the resource collision and In-Band Emission (IBE) between different UEs. When there are many P-UEs, the performance of the V2X communication system will be influenced seriously.

However, there is currently not a specific method for a P-UE to select resources, that is, under what circumstances should the P-UE use which resource selection mode.

Through the above analysis, it can be seen that in P2V communication scenarios, a specific method for a P-UE to select resources is required, and such a method is not published yet. In addition, a resource selection method which can reduce power loss and avoid the mutual interference between UEs is desired, and such a method has not been disclosed at present.

FIG. 1 is a schematic diagram illustrating existing resource scheduling and existing resource reservation. As shown in FIG. 1, according to a current 3GPP discussion conclusion, when performing resource selection in a subframe n, a V2X UE predicts an idle resource after the subframe n according to a channel sensing result in [n−a, n−b], wherein a−b is no less then 1 s, so as to obtain enough absolute resource occupancy information. When selecting an idle frequency resource in the subframe n+d for transmission of a first data packet, the UE may further reserve a same frequency resource in subframe n+e for transmission of a data packet generated later, wherein e=n+d+j*P, j=i, 2i, . . . , J*i. i*P expresses a resource occupancy period, P expresses a minimum resource occupancy period, e.g., P=100 ms or 50 ms, J expresses the maximum number of times of resource reservation. The V2X UE directly or indirectly notifies d and e to a reception V2X UE through a Scheduling Assignment (SA), as shown in FIG. 1. There is no conclusion for values of P, i and J. It can be seen that the resource reservation period is integral multiple of P. In addition, in order to ensure channel sensing effectiveness, after performing resource selection, the V2X UE semi-statically occupies resources according to a period i*P until a resource reselection criterion is satisfied.

However, according to a V2X data packet generation criterion specified by ETSI, the generation period of the V2X data packet totally depends on a moving state of a V2X UE. For example, when a moving direction of the V2X UE changes 4°, a moving distance is more than 4 m, or a moving speed is increased or decreased 0.5 m/s, the V2X UE generates a V2X data packet, finally, the generation period of the V2X data packet may be any value within [100 ms, 1 s]. In addition, there is a strictly time delay requirement for the V2X data packet, according to a 3GPP standard requirement, the V2X UE must transmit a generated V2X data packet in 100 ms. However, since a minimum granularity of a resource occupancy period is P, and the resource occupancy period and a generation period of a V2X data packet are usually not exactly equal to each other, a difference between them may cause that there is no reserved transmission resource in 100 ms after generating the V2X data packet. As shown in FIG. 2, when the moving speed of the V2X UE is 57 km/h, the UE may move 4 m in 252 ms, and the generation period of the V2X data packet is 252 ms. When the minimum granularity of the resource occupancy period is 100 ms, the resource occupancy period applying to the data packet generation period is only 200 ms or 300 ms, the resource reserved according to any of the periods at most only ensures three data packets to satisfy the time requirement, in this condition, the V2X UE must re-select the resource, so as to ensure the time delay requirement of data transmission.

According to analysis above, it can be seen that the difference between the generation period of the V2X data packet and the resource occupancy period can cause that the time delay requirement of the V2X data is not satisfied, however, there is no ideal technical solution to solve the problem above at present.

From the above, it can be seen that the difference between the generation period of the V2X data packet and the resource occupancy period can cause that the time delay requirement of the V2X data is not satisfied, however, there is no ideal technical solution to solve the problem above at present.

SUMMARY

The present disclosure is intended to cure at least one of the foregoing technical issues in the traditional art, and provides a method and apparatus for selecting resources in V2X communications, including: determining, by a user equipment (UE), configuration information of one or more transmission resource pools of a current working carrier; selecting, by the UE, one resource pool from the one or more transmission resource pools as a transmission resource pool; and selecting, by the UE, transmission resource(s) according to a corresponding resource selection mode from the transmission resource pool, and transmitting physical signal(s) through the transmission resource.

Preferably, the UE determines the configuration information of the one or more transmission resource pools of the current working carrier according to a pre-configuration, or the UE receives configuration signaling from an eNB, and obtains configuration information of the one or more transmission resource pools of the current working carrier according to the configuration signaling.

Preferably, configuration information of the transmission resource pool of the current working carrier includes one or more of the following: a set of subframes of the transmission resource pool, a set of physical resource blocks of the transmission resource pool, or a resource selection mode allowed by the transmission resource pool.

Preferably, in response to the resource selection mode allowed by the transmission resource pool being a random (RM) resource selection mode, then the configuration information of the transmission resource pool includes a data priority for semi-statically occupying resources allowed by the transmission resource pool and a channel busy ratio (CBR) threshold allowed by the transmission resource pool; and in response to the resource selection mode allowed by the transmission resource pool being a partial-channel-sensing-based (PS) resource selection mode, then the configuration information of the transmission resource pool includes a priority of data allowed to be transmitted by the resource pool.

Preferably, the UE selects the RM resource pool as the transmission resource pool, in response to there being multiple candidate resource pools on the current working carrier, and among the multiple candidate resource pools, there being not only an RM resource pool which allows random resource selection but also a PS resource pool which does not allow random resource selection, then in response to the UE having not performed channel sensing in the PS resource pool, or in response to the UE having performed channel sensing in the PS resource pool but there being not an available resource currently in the PS resource pool according to a specific resource selection condition.

Preferably, in response to the UE selecting the RM resource pool as the transmission resource pool, the UE selects a resource from the RM resource pool through a RM resource selection mode, and a physical layer of the UE starts to perform partial channel sensing starting from a subframe p or a subframe p+1 when any one or more of the following conditions is met: receiving a partial channel sensing instruction in the subframe p from a higher layer of the UE; receiving an instruction from an eNB; and configuration information of the PS resource pool including a priority of data allowed to be transmitted by the PS resource pool, and a priority of a data packet to be transmitted by the UE is higher than the priority of the data allowed to be transmitted by the PS resource pool.

Preferably, for the UE that performs partial channel sensing in the PS resource pool, in response to the UE performing resource re-selection in subframe n and there being a resource within a resource selection window [n+T1, n+T2] that meets an available resource condition, the UE selects the PS resource pool where the partial channel sensing is performed as the transmission resource pool, where T1 and T2 are positive integers.

Preferably, in response to a current CBR value $R_n$, being larger than a CBR threshold allowed by the transmission resource pool according to the configuration information of the transmission resource pool, a higher layer of the UE instructs a physical layer of the UE to perform the partial channel sensing; or in response to the current CBR value $R_n$ being larger than the CBR threshold allowed by the transmission resource pool according to the configuration information of the transmission resource pool, the higher layer of the UE randomly generates a random number between [0, 1], and in response to the random number generated being larger than a first threshold, then the higher layer of the UE instructs the physical layer of the UE to perform the partial channel sensing, and in response to the random number generated being smaller than the first threshold, then the higher layer of the UE sets $R_n$ to zero; or the higher layer of the UE instructs the physical layer of the UE to perform the partial channel sensing upon receiving N consecutive physical layer event reports of the UE, or the higher layer of the UE randomly generates a random number between [0, 1] upon receiving the N consecutive physical layer event reports of the UE, and in response to the random number generated being larger than a second threshold, the higher layer of the UE instructs the physical layer of the UE to perform the partial channel sensing, and in response to the random number generated being smaller than the second threshold, the higher layer of the UE sets a counter of physical layer event reports received to zero.

Preferably, the physical layer of the UE reports a CRB measurement result in each period to the higher layer of the UE, and the higher layer of the UE performs smooth filtering for the CRB measurement result reported by the physical layer of the UE, and obtains a current CBR value; or the physical layer of the UE reports an event of a CRB value measured being higher than a third threshold in response to the CRB value is higher than the third threshold.

Preferably, the physical layer of the UE starts to perform partial channel sensing starting from a subframe p in response to the UE selecting a resource through the PS resource selection mode from the PS resource pool and the subframe p meeting one or more of the following conditions: (1) condition 1: t+(COUNTER+1)*SAI−p−100≤W, where COUNTER is a value of a resource re-selection counter in the subframe p, t is a subframe where the value of the resource re-selection counter most recently changes, SAI is a resource reservation interval indicated by a PSCCH sent by the UE most recently, and W is a size of a partial channel sensing window; (2) condition 2: the subframe p is a first subframe that satisfies the condition 1 after the resource re-selection counter is initialized most recently; and (3) condition 3: the random number between [0, 1] generated by the UE in the subframe p is larger than a fourth threshold.

Preferably, the UE adopts a one-shot RM resource selection mode to select the transmission resource; or the UE adopts an RM resource selection mode with resource reservation.

Preferably, in response to the UE selecting the transmission resource in a subframe n and the UE selecting the transmission resource through the one-shot RM resource selection mode, then the UE randomly selects PSCCH and PSSCH resources for an initial transmission of a current data packet from a subframe range [n+T1, n+T2], and in response to the data packet being allowed to be re-transmitted, then the UE randomly selects PSCCH and PSSCH resources for a re-transmission of the data packet from the subframe range [n+T1, n+T2], where T1 and T2 are positive integers; in response to the UE adopting the RM resource selection mode with resource reservation, then the UE randomly selects a frequency resource of a certain subframe for PSCCH and PSSCH transmission of the initial transmission and the re-transmission of the current data packet from the subframe range [n+T1, n+T2], and reserves same frequency resources on C subframes for PSCCH and PSSCH transmission of a new data packet at a specific period, where a value of C is randomly decided by the UE from a certain range.

Preferably, the UE adopts the RM resource selection mode with resource reservation in response to a priority of data to be transmitted is higher than a priority of data allowed to semi-statically occupy resources configured for the transmission resource pool, or otherwise, the UE adopts the one-shot RM resource selection mode.

An apparatus for selecting resources in vehicle-to-everything (V2X) communications, including: a resource pool configuration determination module, a transmission resource pool selection module, and transmission resource(s) selection and signal transmission module; in which the resource pool configuration determination module is to determine configuration information of resource pools of a current working carrier; the transmission resource pool selection module is to select a transmission resource pool according to statuses of candidate resource pools and a status of channel sensing; and the transmission resource selection and signal transmission module is to select transmission resource(s) from the transmission resource pool and transmit physical signal(s) through the transmission resource.

According to the technical scheme of the present disclosure, a UE first determines configuration information of one or more transmission resource pools of a current working carrier according to a pre-configuration or instruction signaling from an eNB, then the UE selects a transmission resource pool according to statuses of resource pools and a status of channel sensing; and the UE selects transmission resource(s) from the transmission resource pool according to a corresponding resource selection mode and transmits physical signal(s) through the transmission resource. Through the method of the present disclosure, when the load of a resource pool that allows random resource selection is relatively low, the UE may select the resource pool as a transmission resource pool, and select a resource using a random resource selection mode to reduce power loss of the UE. When the load of the resource pool is relatively high, the UE that supports partial channel sensing may select another resource pool as the transmission resource pool, so as to reduce the level of the load of the resource pool. The method can take into account both the power loss of the UE and the load control of the resource pool, and can improve an overall performance of the system.

In addition, the present disclosure provides a method and equipment for transmitting data in V2X communication. The method includes the steps of: if a resource selection mode for a resource pool currently selected by a UE is configured to be based on channel sensing, by the UE, selecting a part of subframes belonging to the selected resource pool within P ms as a channel sensing window, and repeating the channel sensing window at a period of P; and after channel sensing, by the UE, selecting a transmitting resource and transmitting data.

Preferably, P is a minimum granularity of the period of resource occupancy of all UEs in the current resource pool and a minimum delay requirement of the current service of the UE.

Preferably, when specific conditions are satisfied, the UE adjusts the channel sensing window.

Preferably, W2 subframes in the channel sensing window are successive in time, W2 is not less than Wm, and the value of W2 can be changed during the whole channel sensing process; where Wm denotes a minimum value of the channel sensing window which has to be maintained by the UE.

Preferably, the UE adds subframes into the channel sensing window, or the UE removes some subframes from the channel sensing window, and the number of subframes, which have experienced more than I times of channel sensing, within the channel sensing window after removal is not less than Wm, where I is a specific value and denotes the minimum number of detections that should be made for a resource within the channel sensing window so as to obtain a valid detection result for the resource.

Preferably, the UE expands and then shrinks the channel sensing window, where the number of subframes, which have experienced more than I times of channel sensing, within the channel sensing window after the shrinking of the channel selection window should not be less than Wm; or the UE directly changes the position of the channel sensing window.

Preferably, subframes contained in the expanded channel sensing window is a superset of the channel sensing window before expanded, and the subframes in the expanded channel sensing window are distributed successively in time; and after the UE expands the channel sensing window by I*P ms, the channel sensing window is shrunken to Wm, and subframes in the shrunken channel sensing window are still distributed successively.

Preferably, the UE, in a subframe n, selects a transmitting resource from the channel selection window, wherein a subframe m for the UE within the channel selection window should satisfy the following conditions: a subframe m−P belongs to the channel sensing window for the UE, the UE has performed channel sensing in all subframes with an index m−i*P subframes with an index m−n>c_min, and subframes with an index n−(m−P)≥b; where $1=1,2,\ldots,I$; $c\_min$ is a specific value and denotes a minimum time for encoding a control channel and a data channel; and b is a specific value and denotes the time required by the UE to process the result of channel sensing.

Preferably, if the number of subframes within a channel selection window is 0, the UE randomly selects a transmitting resource between subframes n+c_min and n+d_max, where d_max is the maximum delay tolerance for the current service.

Preferably, the UE selects a transmitting resource only within the determined channel selection window; or, if the energy of resources within the current channel selection window is higher than a certain threshold, the UE randomly selects a transmitting resource between subframes n+c_min and n+d_max; or, if the energy of resources within the current channel selection window is higher than a certain threshold, the UE randomly selects a transmitting resource from subframes not belonging to the channel selection window between subframes n+c_min and n+d_max.

An equipment for transmitting data in V2X communication is provided, including: a channel sensing window determination module configured to, if a resource selection mode of a resource pool currently selected by a UE is configured to be based on channel sensing, select a part of subframes belonging to the selected resource pool within P ms as a channel sensing window, and repeat the channel sensing window at a period of P; a resource selection module configured to select a transmitting resource after the channel sensing; and a data transmission module configured to transmit data by using the selected transmitting resource.

In the technical solutions provided by the present disclosure, within each period P, a UE performs channel sensing only in few subframes, so that the power loss of the UE can be effectively reduced. The size of a detection window for the UE to perform channel sensing can be not less than a minimum value Wm determined by the standard, or the UE uses Wm as the size of the channel sensing window in a stable state. When specific conditions are satisfied, the UE can temporarily expand the channel sensing window or change the position of the channel sensing window, so that a valid result of channel sensing can be obtained for channel selection. The UE can preferentially select a transmitting resource according to the result of channel sensing. When the result of channel sensing is unavailable, or when resources within a detection range cannot satisfy the UE's requirements, complementation can be performed by random resource selection. The method provided by the present disclosure can ensure the performance of V2X communication with a low complexity, and effectively reduce the energy loss of the UE.

The present disclosure further provides a resource selecting method and apparatus in V2X communication.

The present disclosure provides a resource selecting method in Vehicle to Everything (V2X) communication, which includes: selecting, by a user equipment (UE), a subframe where a resource for first data transmission is located; determining, by the UE, a resource occupancy period; and transmitting, by the UE, a Scheduling Assignment (SA) for performing resource reservation.

Preferably, the UE selecting the subframe where the resource for the first data transmission is located comprises: selecting, by the UE, the subframe where the resource for the first data transmission is located according to at least one of the following criterions: under the premise of satisfying a time delay requirement of a data packet, the number of times of occupying a same frequency resource is largest; collision among different UEs is smallest; interference to high priority data is smallest.

Preferably, the UE determining the resource occupancy period comprises: determining, by the UE, the resource occupancy period according to at least one of the following criterions: a difference with a data packet generation period is smallest; the number of times of occupying a same frequency resource is largest. Preferably, the UE firstly determines the resource occupancy period, and then selects the subframe where the resource for first data transmission is located according to the determined resource occupancy period.

Preferably, the UE firstly selects the subframe where the resource for the first data transmission is located, and then determines the resource occupancy period according to the subframe where the resource for the first data transmission is located.

Preferably, the method further includes: determining a value of $C_{Resel}$, wherein $C_{Resel}$ is the number of resources can be selected by the UE in one resource selection operation, wherein time intervals between any two consecutive resources of the $C_{Resel}$ resources are same or different; determining, by the UE, $C_{Resel}-1$ resource occupancy periods corresponding to a subframe where each candidate resource for the first data transmission is located, selecting the subframe where the resource for the first data transmission from subframes of candidate resources for the first data transmission is located according to a channel detection result.

Preferably, determining the $C_{Resel}-1$ resource occupancy periods corresponding to the subframe where each candidate resource for the first data transmission is located comprises: denoting a subframe range of the resource for the first data transmission as [T1, T2], wherein T1≤4, 20≤T2≤100, for each subframe m in [T1, T2], determining $C_{Resel}-1$ resource occupancy periods $P_{m,j}^{reserv}$ corresponding to the subframe m according to the following formula:

$$P_{m,j}^{rsvp} = \begin{cases} \text{floor}(P_{pkt}/P), & T_{j-1} + \text{floor}(P_{pkt}/P) - P_{pkt} \times (j-1) \geq 0 \\ \text{ceil}(P_{pkt}/P), & \text{other} \end{cases}, \text{ or}$$

$$P_{m,j}^{rsvp} = \begin{cases} \text{ceil}(P_{pkt}/P), & T_{j-1} + \text{ceil}(P_{pkt}/P) - P_{pkt} \times (j-1) < M_{delay} \\ \text{floor}(P_{pkt}/P), & \text{other} \end{cases}$$

wherein j=1, 2, . . . , $C_{Resel}-1$;

$T_{j-1}$ expresses a location of a subframe for a (j−1)-th resource, $$T_{j-1} = \begin{cases} m, & j = 1 \\ m + \sum_{l=1}^{j-1} P_{m,l}^{rsvp}, & \text{other} \end{cases};$$

P expresses a minimum granularity of the resource occupancy period;

$P_{pkt}$ expresses the data packet generation period of the UE;

$M_{delay}$ expresses a maximum tolerable delay of a current data packet.

Preferably, selecting the subframe where the resource for the first data transmission from the subframes of the candidate resources for the first data transmission is located according to the channel detection result comprises: according to the channel detection result, excluding a single subframe resource in [$T_1$, $T_2$] from the subframes of the candidate resources for the first data transmission, wherein the single subframe resource $R_{x,y}$ is consecutive L PRBs starting from a PRB with an index x in a subframe y, L is a configured value.

Preferably, according to the channel detection result, excluding the single subframe resource in [$T_1$, $T_2$] from the subframes of the candidate resources for the first data transmission comprises: when the UE detects a SA transmitted by another UE before a subframe m, the data channel scheduled through the SA is within a subframe s, indices of the PRBs occupied by the data channel are $PRB_0^{Rx}$, $PRB_1^{Rx}$, . . . $PRB_{RM}^{Rx}$, wherein RM expresses the number of PRBs occupied by the data channel, and a same set of PRBs in a subframe $s+P_s^{rsvp\_Rx}$ is reserved with a reservation period $P_s^{rsvp\_Rx}$ through the SA, when $s+P_s^{rsvp\_Rx}$=m, or $m+P_{m,1}^{rsvp}$, or $m+P_{m,1}^{rsvp}+P_{m,2}^{rsvp}$, or $$m + \sum_{l=1}^{C_{Resel}-1} P_{m,l}^{rsvp},$$

for the data channel scheduled through the SA, reception power measured in a subframe s by the UE is larger than a preset threshold, and the single subframe resource $R_{x,m}$ comprises any one or more PRBs with indices $PR_0^{Rx}$, $PR_1^{Rx}$, . . . , or $PRB_{RM}^{Rx}$, excluding by the UE, $R_{x,m}$ from the subframes of the candidate resources for the first data transmission; or when $s+P_s^{rsvp\_Rx}$=m or $m+j \times P^{rsvp}$, and for the data channel scheduled through the SA, reception power measured in a subframe s by the UE is larger than a preset threshold, excluding, by the UE, $R_{x,m}$ from the subframes of the candidate resources for the first data transmission when the single subframe resource $R_{x,m}$ comprises any one or more PRBs with indices $PRB_0^{Rx}$, $PRB_1^{Rx}$, . . . , or $PRB_{RM}^{Rx}$, wherein $P^{rsvp}$ is a designated value defined in specification or selected by the UE, j=1, 2, . . . , $A \times C_{Resel}-1$, A is a specific value.

The present disclosure further provides a resource selecting apparatus in Vehicle to Everything (V2X) communication, which includes: a first transmission resource selecting module, to select a subframe where a resource for first data transmission is located; a resource occupancy period reserving module, to determine a resource occupancy period; and a communication module, to transmit a Scheduling Assignment (SA) for performing resource reservation.

According to the technical solution provided by the present disclosure, the UE can maximize the number of times of occupying a same frequency resource, so as to avoid unnecessary resource reselection, by preferably selecting the resource occupancy period nearest to the data packet generation period, or by selecting the minimum large period and the maximum small period according to a location of transmission of the first data packet after resource selection or the resource reselection; or by firstly using the minimum large period and using the maximum small period according to a designated period interval, or by selecting the resource occupancy period satisfying the time delay requirement according to the generation location of the data packet. The reception UE may determine the location of the reservation resource according to a related indication in SA transmitted by the transmission UE. According to the technical solution provided by the present disclosure, performance of the V2X system can be improved through low implementation complexity.

According to the embodiments of the present invention, resource for V2X communication can be efficiently utilized. Specifically, the time delay requirement of V2X communication can be satisfied.

DETAILED DESCRIPTION

To make the objects, technical means and advantages of the present disclosure more clear, the present disclosure will be further illustrated in combination with the attached drawings.

Figure 1:
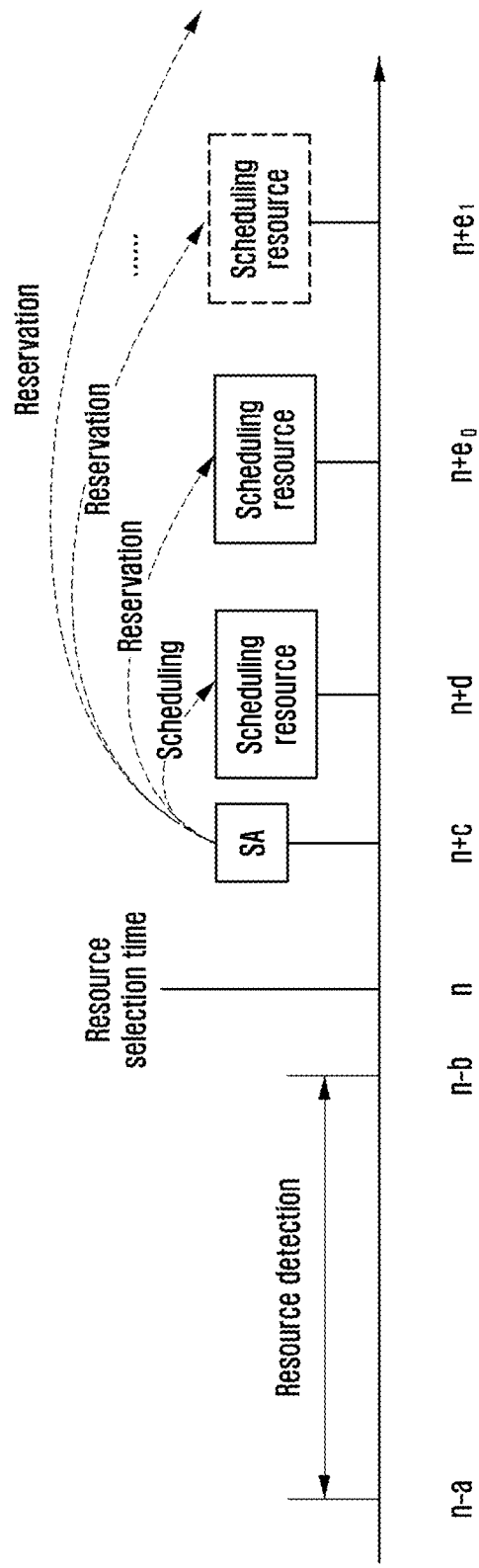
FIG. 1 is a schematic diagram illustrating existing resource scheduling and existing resource reservation.
Figure 2:
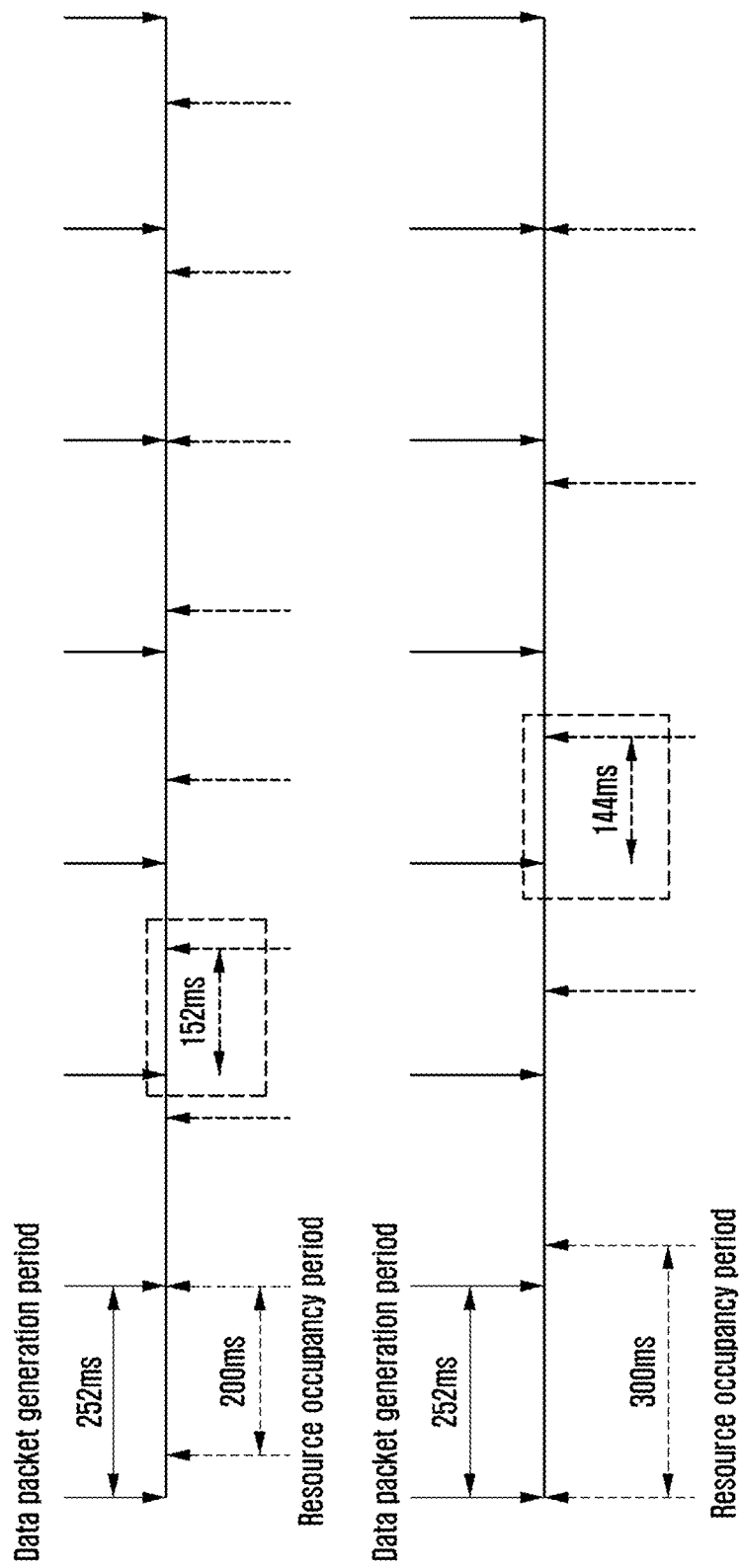
FIG. 2 is a schematic diagram illustrating time delay of existing transmission of a V2X data packet.
Figure 3:
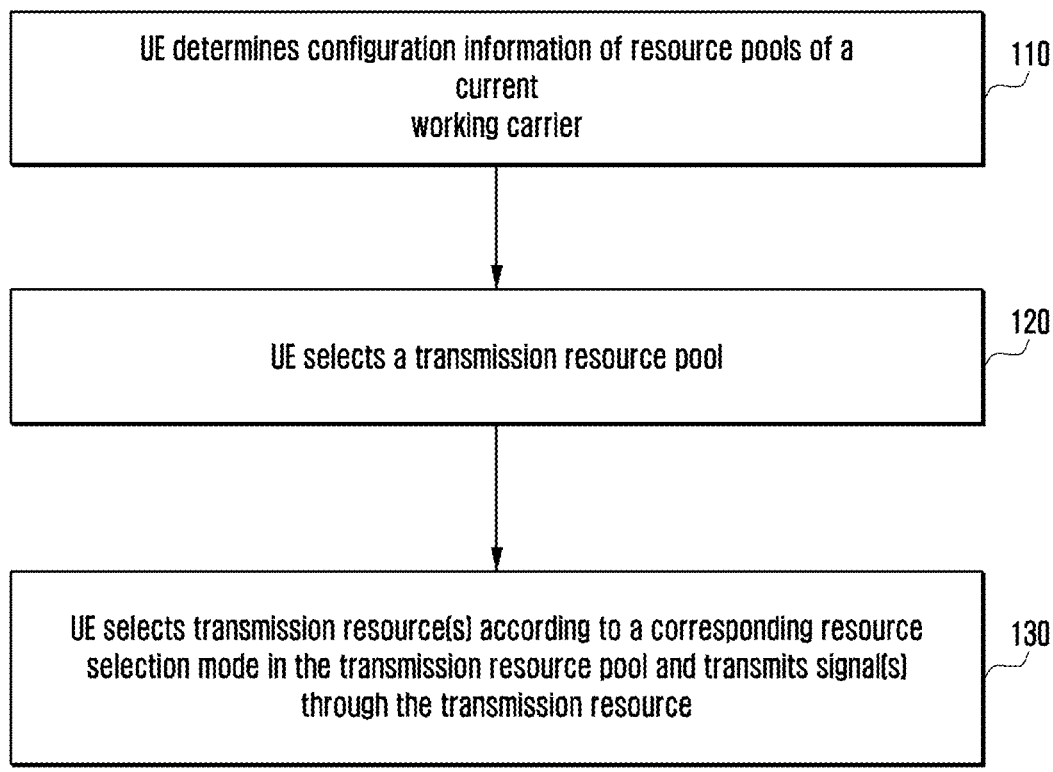
FIG. 3 is a flowchart of steps for implementing the technical scheme provided according to the present disclosure.

In V2X communications, if a UE transmitting data is a P-UE, it cannot tolerate long-term channel sensing due to the limitation of UE battery power. Therefore, the transmission resource selection mechanism based on is channel sensing defined by the traditional 3GPP standards does not apply to the P-UE. For this reason, the 3GPP standards define a random (RM) resource selection mode and a partial sensing (PS) resource selection mode for a P-UE working in an autonomous resource selection mode (i.e., Mode 4 defined in the traditional 3GPP standards to reduce the power loss of the P-UE. However, there is still not a clear solution regarding how the P-UE should effectively and reasonably use these two transmission resource selection modes. Therefore, the present disclosure proposes a method for selecting a resource in V2X communications. In the following, the UEs refer to a P-UE working in an autonomous resource selection mode or a terminal that has same or similar resource selection requirements with the P-UE working in the autonomous resource selection mode, unless otherwise specified. As shown in FIG. 3, the method includes the following steps.

Step 110: a UE determines configuration information of one or more transmission resource pools of a current working carrier.

In the present disclosure, configuration information of the one or more transmission resource pools of the current working carrier includes one or more of the following: a set of subframes of the one or more transmission resource pools, a set of physical resource blocks (PRBs) of the one or more transmission resource pools, a resource selection mode allowed by the one or more transmission resource pools, and so on. If a resource selection mode allowed by a resource pool is the RM resource selection mode, then configuration information of the resource pool may further include a data priority allowed for semi-static resource occupation by the resource pool, a channel busy ratio (CBR) threshold allowed by the resource pool, and so on. If the resource selection mode allowed by the resource pool is the PS resource selection mode, then configuration information of the resource pool may further include a priority of data allowed to be transmitted by the resource pool. If the resource selection mode allowed by the resource pool includes the RM resource selection mode, then the UE may select transmission resource(s) from the resource pool through the RM resource selection mode, or otherwise, the UE can only select transmission resource(s) from the resource pool through the PS resource selection mode. In the following, a resource pool that allows the RM resource selection mode is called an RM resource pool, and a resource pool that does not allow the RM resource selection mode is called a PS resource pool. In the present disclosure, the RM resource pool and the PS resource pool may be partially or completely overlap.

The UE may obtain configuration information of the one or more transmission resource pools of the current working carrier by a pre-configuration or by receiving configuration signaling from an eNB.

Step 120: the UE selects one resource pool from the one or more transmission resource pools in the previous step as a transmission resource pool.

In the present disclosure, if there are multiple candidate resource pools on the current working carrier, and among the multiple candidate resource pools, there are not only an RM resource pool but also a PS resource pool, if the UE has not performed channel sensing in the PS resource pool, or if the UE has performed channel sensing in the PS resource pool but there is not an available resource currently in the PS resource pool according to a specific resource selection condition, the UE should select the RM resource pool. Or otherwise, the UE should select the PS resource pool.

If there is only one kind of resource pool for the current working carrier, the UE proceeds directly to step 130.

Step 130: the UE selects transmission resource(s) according to a corresponding resource selection mode from the transmission resource pool, and transmits physical signal(s) through the transmission resource(s).

In order to facilitate understanding of the present disclosure, the above-described technical scheme of the present disclosure will be described in detail by way of interactions between devices in combination with specific application scenarios, as follows:

EMBODIMENT 1

In the present embodiment, there are only RM resource pools for a current working carrier of a UE, and the UE only performs RM resource selection in the RM resource pools. The detailed method is as follows:

Step 210: the UE determines configuration information of one or more transmission resource pools of a current working carrier.

In the present embodiment, configuration information of a transmission resource pool of the current working carrier includes a resource selection mode allowed by the transmission resource pool, and includes one or more pieces of the following information: a set of subframes of the transmission resource pool, a set of physical resource blocks (PRBs) of the transmission resource pool, a data priority allowed for semi-static resource occupation by the transmission resource pool, and so on. The resource selection mode allowed by the transmission resource pool is an RM resource selection mode.

Step 220: the UE selects transmission resource(s) according to an RM resource selection mode from an RM transmission resource pool, and transmits physical signal(s) through the transmission resource(s).

According to one implementation method of the present embodiment, the UE may adopt a one-shot RM resource selection mode to perform resource selection. According to the one-shot RM resource selection mode, if the UE performs resource selection in a subframe n, then the UE should randomly select PSCCH and PSSCH resources for the initial transmission of a current data packet from a subframe range [n+T1, n+T2], and if the data packet is allowed to be re-transmitted, then the UE further randomly selects PSCCH and PSSCH resources for re-transmission of the data packet from the above subframe range. When the UE transmits PSCCH on a resource selected in this way, the UE may set a resource reservation interval field (Reservation Interval) to zero, or may set it to a random number to randomize a cyclic redundancy check (CRC) bit of the PSCCH. The UE should set a priority field (Priority) in the PSCCH to a priority of data currently transmitted, or set it to zero, or set it to a random number using a method similar to that used by the resource reservation interval field to further randomize the CRC bit of the PSCCH. T1 and T2 are positive integers and selected by the UE, where T1≤4, 20≤T2≤100, and a value of T2 selected by the UE should meet a data packet delay requirement.

According to another implementation method of the present disclosure, the UE may adopt an RM resource selection mode with resource reservation. According to this mode, if the UE meets a resource re-selection condition in the subframe n, the UE should randomly select a frequency resource of a certain subframe for PSCCH and PSSCH transmission of the initial transmission of the current data packet from the subframe range [n+T1, n+T2], and reserve the same frequency resources on C subframes for PSCCH and PSSCH transmission of a new data packet with a specific period, where the value of C is randomly decided by the UE within a certain range, and preferably, the certain range may be [5, 15]. To be specific, if the UE selects frequency resource(s) of a subframe m in the subframe n, where m belongs to [n+T1, n+T2], then the UE further reserves the same frequency resource(s) on subframes $$m + \sum_{i=1}^{C} P_{rsvp,i},$$

where i=1, 2, 3, . . . , C, $P_{rsvp,i}$ is a reservation interval for the i-th reserved resource, which is determined by the UE. It should be noted that reservation intervals of the reserved resources of the C times may be equal. In this case, the UE may further reserve the same frequency resources on subframes m+i×$P_{rsvp}$, where i=1, 2, 3, . . . , C, and $P_{rsvp}$ is a reservation interval for a reserved resource and decided by the UE. If the UE further selects re-transmission resource(s) for the data packet from the subframe range [n+T1, n+T2] in the subframe n, then the UE will reserve the retransmission resources for C times with the same reservation interval and the same way as that for initial transmission resource(s).

Compared with the RM resource selection mode with resource reservation, the UE adopting the one-shot RM resource selection mode randomly selects transmission resource(s) for each data packet, which can avoid continuous resource collision between multiple UEs. If there are UE(s) which select resources based on channel sensing in the resource pool, then if the UE adopts the RM resource selection mode with resource reservation, this method can protect this part of resources from being interfered by the UEs which select resources based on channel sensing. The UE may decide to adopt which RM resource selection mode according to a priority of data to be transmitted. For example, if the priority of the data to be transmitted is higher than the data priority allowed for semi-static resource occupation obtained in step 210, then the UE uses the RM resource selection mode with resource reservation, so as to better protect the data with a higher priority, or otherwise, the UE uses the one-shot RM resource selection mode, so as to avoid too much continuous resource collision; or, if the current transmission resource pool of the UE only allows the RM resource selection mode, then the UE adopts the one-shot RM resource selection mode, and if the current transmission resource pool of the UE not only allows the RM resource selection mode, but also allows the PS resource selection mode, then the UE uses the RM resource selection mode with resource reservation.

At this end, the present embodiment ends. In the present embodiment, there are only the RM resource pools on the current working carrier of the UE, and the UE may adopt the one-shot RM resource selection mode or the RM resource selection mode with resource reservation to select a resource from the RM resource pools, so as to carry out resource selection of the UE with a low complexity.

EMBODIMENT 2

In the present embodiment, there is not only an RM resource pool but also a PS resource pool on a current working carrier of a UE, and the UE does not perform PS resource selection in the RM resource pool. If the UE supports the PS resource selection mode, then the UE starts to perform channel sensing in the PS resource pool when the CBR in the RM source pool is higher than a certain threshold. If there are resources meeting a specific available resource condition in a resource selection window of the PS resource pool when the UE performs resource selection, then the UE selects a resource from the PS resource pool, or otherwise, the UE selects a resource from the RM resource pool. If the UE does not support the PS resource selection mode, the UE performs resource selection in the RM resource pool by the method described in the first embodiment, which will not be described again in the present embodiment. It is to be noted that in this embodiment, the RM resource pool and the PS resource pool may be completely or partially overlapped. The detailed method is as follows:

Step 310: a UE determines configuration information of one or more transmission resource pools of a current working carrier.

In the embodiment, there is not only an RM resource pool but also a PS resource pool. For the RM resource pool, configuration information of the RM resource pool should include a set of subframes of the RM resource pool, a set of PRBs of the RM resource pool, a resource selection mode allowed by the RM resource pool, a data priority allowed for semi-static resource occupation by the RM resource pool, whether the RM resource pool allows a UE which supports the PS resource selection mode to use, and if yes, a CBR threshold that the RM resource pool allows this kind of UE to use (referred to as CBR threshold allowed by a resource pool hereinafter), and so on. The CBR threshold allowed by a resource pool represents that when a CBR value of a resource pool is smaller than the CBR threshold, a UE that supports the PS resource selection mode is able to select a resource from the resource pool, or otherwise, this type of UE is not allowed to select a resource from the resource pool. It is to be particularly noted that whether the resource pool allows a UE that supports the PS resource selection mode may be indicated by setting the CBR threshold of the resource pool to negative infinity. If the resource selection mode allowed by the resource pool is the PS resource selection mode, then configuration information of the resource pool may further include a priority of data allowed to be transmitted by the resource pool.

The UE may obtain configuration information of the resource pools on the current working carrier by being pre-configured or receiving configuration signaling from an eNB.

Step 320: the UE selects one resource pool as a transmission resource pool from the one or more transmission resource pools in the previous step.

In the present embodiment, if the UE supports the PS resource selection mode, a physical layer of the UE should measure the CBR of the resource pool in an RM resource pool and report a measurement result to a higher layer of the UE. The CBR may be defined as a ratio of resources, sidelink-receiving signal strength indicators (S-RSSIs) of which are higher than a specific threshed, to all the resources in a specific time range; where the UE may determine a value of the specific time range by being pre-configured, configured by the eNB, or defined by a standard. For example, a value of the specific time range may be 100 ms as defined by the standard; and the UE may determine a value of the specific threshold by being pre-configured, being configured by the eNB, or being defined by the standard.

Figure 4:
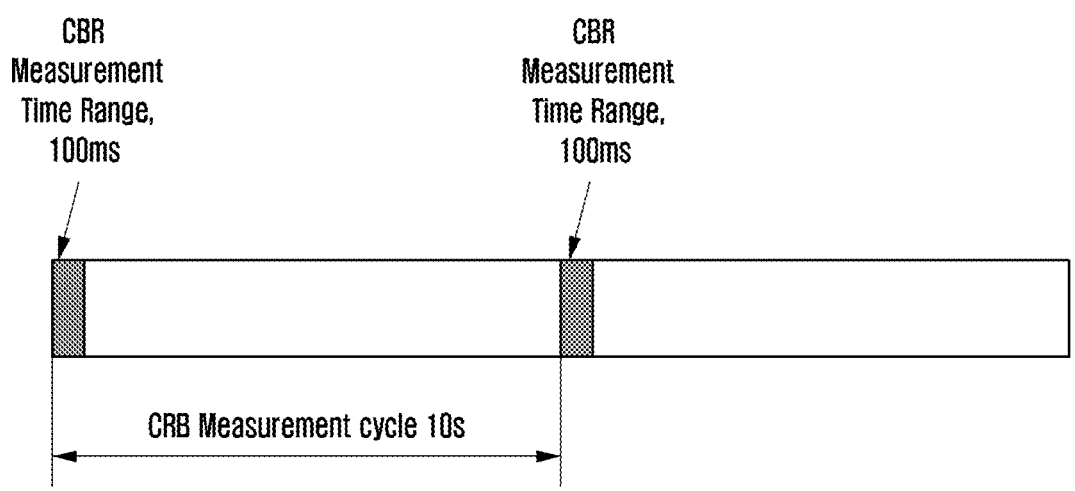
FIG. 4 is a schematic diagram of a possible method for a UE to measure CBR of an RM resource pool according to the present disclosure.

The UE may measure the CBR of the RM resource pool according to a particular period, and the UE may determine a value of the particular period by being pre-configured, configured by the eNB, or defined by the standard. For example, the particular circle defined by the standard is 10 s. FIG. 4 shows a possible way for a UE to measure the CBR of a RM resource pool, where a time range to measure the CBR is 100 ms, and a period to measure the CBR is 10 s.

According to one implementation method of the present disclosure, the physical layer of the UE reports a CRB measurement result in each period to the higher layer of the UE, and the higher layer of the UE performs a smoothing and filtering operation for the CBR measurement result reported by the physical layer to obtain a current CBR value. For example, the current CBR value $R_n$ may be $R_n=(1-\alpha) \times R_{n-1}+\alpha \times r_n$, where $R_{n-1}$ represents a CBR value corresponding to a previous report by the physical layer of the UE, $r_n$ represents a CBR value currently reported by the physical layer of the UE, and $\alpha$ represents a smoothing and filtering coefficient. The UE may determine the value of $\alpha$ by being pre-configured, configured by the eNB, or defined by the standard.

In the manner described above, the higher layer of the UE may directly instruct the physical layer of the UE to perform partial channel sensing when $R_n$ is larger than the CBR threshold allowed by the resource pool contained in configuration information of the resource pool. Or, the higher layer of the UE may generate a random number between [0, 1] when $R_n$ is larger than the CBR threshold, and if the random number generated is larger than a specific threshold (the UE may determine the specific threshold by being pre-configured, configured by the eNB, or defined by the standard), then the higher layer of the UE instructs the physical layer of the UE to perform partial channel sensing, and if the random number generated is smaller than the specific threshold, then the higher layer of the UE will set $R_n$ to zero. The CBR threshold allowed by the resource pool is correlated with a priority of data transmitted by the UE. That is, a value of the CBR threshold may be inversely correlated with the priority of data transmitted by the UE (the higher the priority of the data is, the lower the value of the CBR threshold is), and the value of the CBR threshold may include positive infinity and negative infinity. It is to be particularly noted that, if the value of the CBR threshold is positive infinity, then the UE may not perform the CRB measurement; and if the value of the CBR threshold is negative infinity, and if the UE supports the PS resource selection mode, the UE is not allowed to select transmission resource(s) from the RM resource pool.

According to another implementation method of the present disclosure, the physical layer of the UE reports the event that a measured CBR value is above a specific threshold to the higher layer. The UE may determine the value of the specific threshold by being pre-configured, configured by the eNB, or defined by the standard. In this manner, the higher layer of the UE may instruct the physical layer of the UE to perform partial channel sensing when it receives N continuous event reports from the physical layer of the UE. Or the higher layer of the UE may generate a random number between [0, 1] when it receives N continuous event reports from the physical layer of the UE, and if a random number generated is larger than a specific threshold (the UE may determine the value of the specific threshold by being pre-configured, configured by the eNB, or defined by the standard), the higher layer of the UE will instruct the physical layer of the UE to perform partial channel sensing, and if the random number generated is smaller than the specific threshold, then the higher layer of the UE will set a counter of the event reports received from the physical layer to zero. The UE may determine the value of N by being pre-configured, configured by the eNB, or defined by the standard. The value of N may be correlated to the priority of data transmitted by the UE. For example, the value of N may be reversely correlated with the priority of the data transmitted by the UE (the higher the priority of the data is, the smaller the N is), and the value of N may include positive infinity and 0. It is to be particularly noted that if the value of the threshold is positive infinity, then the UE is not necessary to perform a CBR measurement; and if the value of the threshold is 0, and if the UE supports the PS resource selection mode, then the UE is not allowed to select transmission resource(s) in the RM resource pool.

If the UE is currently selecting a resource according to the RM resource selection mode from the RM resource pool, the physical layer of the UE may start to perform partial channel sensing in the PS resource pool from a subframe p or subframe p+1 when one or more of the following conditions is met: receiving a partial channel sensing instruction from the higher layer of the UE in the subframe p; or receiving an instruction from the eNB; or, configuration information of the PS resource pool includes a priority of data allowed to be transmitted by the resource pool, and the data packet to be transmitted by the UE is higher than the priority of data allowed to be transmitted by the resource pool.

If the UE is currently selecting a resource from the PS resource pool through the PS resource selection mode, the physical layer of the UE may start partial channel sensing from the subframe p when the subframe p meets one or more of the following conditions: (1) condition 1: t+(COUNTER+1)*SAI−p<=W, where COUNTER is the value of a resource re-selection counter (SL_RESOURCE_RESELECTION_COUNTER) in the subframe p, subframe t is a subframe where the value of the resource re-selection counter changed most recently, SAI is a resource reservation interval indicated by PSCCH transmitted in the subframe t by the UE or transmitted most recently by the UE (i.e., a value of the resource reservation interval field contained in the PSCCH transmitted in the subframe t or transmitted most recently multiplied by a basic reservation interval $P_{step}$), and W is a size of a partial channel sensing window, and the UE may determine the value of W according to being pre-configured, or configured by the eNB, or defined by the standard, e.g., W=1001; (2) condition 2: the subframe p is a first subframe that meets the condition 1 after the resource re-selection counter was initialized most recently; or (3) condition 3: when the random number between [0, 1] generated in the subframe p by the UE is larger than a specific threshold, the UE may determine the specific threshold by being pre-configured, configured by the eNB, or defined by the standard.

For a UE performing partial channel sensing, if the UE performs resource re-selection in the subframe n, if there is a resource that meets a specific available resource condition within the resource selection window [n+T1, n+T2], the UE selects a PS resource pool that performs partial channel sensing as a transmission resource pool, or otherwise, the UE selects an RM resource pool as the transmission resource pool. The specific available resource condition may be defined by the standard. For example, if the resource is located in subframe j, where j belongs to [n+T1, n+T2], the UE has detected at least subframes j−M, where M includes 100, 200, 300, 400, 500, 600, 700, 800, 900, and 1000, and the interference from the other terminals on the resource estimated from a sensing results is sufficiently low.

Step 330: the UE selects transmission resource(s) according to a corresponding resource selection mode from the transmission resource pool and transmits physical signal(s) through the transmission resource(s).

If the transmission resource pool selected by the UE is an RM resource pool, the UE selects the transmission resource from the transmission resource pool in the same manner as that in the first embodiment. If the transmission resource pool selected by the UE is a PS resource pool, the UE randomly selects the transmission resources of PSCCH and PSSCH from the resources meeting the specific available resource condition within the resource selection window [n+T1, n+T2].

It is to be noted that if the UE selects transmission resource(s) based on partial channel sensing, the UE may directly perform resource re-selection after the resource re-selection counter is reset to zero. That is, the UE skips the operation of generating a random number randomly in the range [0, 1] (i.e., the parameter probResourceKeep defined currently in the standards) and comparing it with the specific threshold according to the standards after the resource re-selection counter is reset to zero, but the UE performs resource re-selection directly.

At this point, the present embodiment ends. In the present embodiment, when the degree of congestion of the RM resource pool is low, the UE may select the transmission resource(s) from the RM resource pool through the RM resource selection mode, so as to reduce the energy loss of the UE. When the RM resource pool is congested, UEs that supports partial channel sensing are unloaded into the PS resource pool according to a certain probability, which can reduce the congestion situation in the RM resource pool.

EMBODIMENT 3

In the present embodiment, there is not only an RM resource pool but also a PS resource pool on a current working carrier of a UE, and the UE does not perform PS resource selection in the RM resource pool. If the UE performs partial channel sensing in the PS resource pool, the UE stops partial channel sensing when the CBR of the RM resource pool is below a certain threshold, and the UE selects a resource from the PS resource pool. If the UE does not support the PS resource selection mode, the UE performs resource selection in the RM resource pool by the method described in the first embodiment, which will not be described again in the present embodiment. It is to be noted that in this embodiment, the RM resource pool and the PS resource pool may be completely or partially overlapped. The detailed method is as follows:

Step 410: a UE determines configuration information of one or more transmission resource pools of a current working carrier.

In the embodiment, there is not only an RM resource pool but also a PS resource pool. For the RM resource pool, configuration information of the RM resource pool should include a set of subframes of the RM resource pool, a set of PRBs of the RM resource pool, a resource selection mode allowed by the RM resource pool, a data priority allowed for semi-static resource occupation by the RM resource pool, whether the RM resource pool allows a UE which supports the PS resource selection mode to use, and if yes, a CBR threshold that the RM resource pool allows this kind of UE to use (referred to as CBR threshold allowed by a resource pool hereinafter), and so on. It is to be particularly noted that whether the resource pool allows a UE that supports the PS resource selection mode may be indicated by setting the CBR threshold of the resource pool to negative infinity. If the resource selection mode allowed by the resource pool is the PS resource selection mode, then configuration information of the resource pool may further include a priority of data allowed to be transmitted by the resource pool.

The UE may obtain configuration information of the one or more transmission resource pools of the current working carrier by being pre-configured or receiving configuration signaling from an eNB.

Step 420: the UE selects one resource pool as a transmission resource pool from the one or more transmission resource pools in the previous step.

In the present embodiment, if the UE supports the PS resource selection mode, a physical layer of the UE should measure the CBR of the resource pool in an RM resource pool and report a measurement result to a higher layer of the UE. The CBR may be defined as a ratio of resources, sidelink-receiving signal strength indicators (S-RSSIs) of which are higher than a specific threshed, to all the resources in a specific time range; where the UE may determine a value of the specific time range by being pre-configured, configured by the eNB, or defined by a standard. For example, a value of the specific time range may be 100 ms as defined by the standard; and the UE may determine a value of the specific threshold by being pre-configured, being configured by the eNB, or being defined by the standard.

The UE may measure the CBR of the RM resource pool according to a particular period, and the UE may determine a value of the particular period by being pre-configured, configured by the eNB, or defined by the standard. For example, the particular circle defined by the standard is 10 s. FIG. 4 shows a possible way for a UE to measure the CBR of a RM resource pool, where a time range to measure the CBR is 100 ms, and a period to measure the CBR is 10 s.

According to one implementation method of the present disclosure, the physical layer of the UE reports a CRB measurement result in each period to the higher layer of the UE, and the higher layer of the UE performs a smoothing and filtering operation for the CBR measurement result reported by the physical layer to obtain a current CBR value. For example, the current CBR value $R_n$ may be $R_n=(1-\alpha)\times R_{n-1}+\alpha\times r_n$, where $R_{n-1}$ represents a CBR value corresponding to a previous report by the physical layer of the UE, $r_n$ represents a CBR value currently reported by the physical layer of the UE, and $\alpha$ represents a smoothing and filtering coefficient. The UE may determine the value of $\alpha$ by being pre-configured, configured by the eNB, or defined by the standard.

In the manner described above, the higher layer of the UE may directly instruct the physical layer of the UE to stop partial channel sensing when $R_n$ is a certain degree (the UE may determine a value of the certain degree by being pre-configured, configured by the eNB, or defined by the standard) below the CBR threshold allowed by the resource pool contained in configuration information of the resource pool. Or, the higher layer of the UE may generate a random number between [0, 1] when $R_n$ is larger than the CBR threshold, and if the random number generated is not larger than a specific threshold (the UE may determine the specific threshold by being pre-configured, configured by the eNB, or defined by the standard), then the higher layer of the UE instructs the physical layer of the UE to stop partial channel sensing, and if the random number generated is smaller than the specific threshold, then the higher layer of the UE will set $R_n$ to zero. The CBR threshold allowed by the resource pool is correlated with a priority of data transmitted by the UE. That is, a value of the CBR threshold may be positively correlated with the priority of data transmitted by the UE (the higher the priority of the data is, the higher the value of the CBR threshold is), and the value of the CBR threshold may include positive infinity and negative infinity. It is to be particularly noted that, if the value of the CBR threshold is negative infinity, then the UE may not perform the CRB measurement; and if the value of the CBR threshold is positive infinity, and if the UE supports the PS resource selection mode, the UE is not allowed to select transmission resource(s) from the RM resource pool.

According to another implementation method of the present disclosure, the physical layer of the UE reports the event that a measured CBR value is below a specific threshold to the higher layer. The UE may determine the value of the specific threshold by being pre-configured, configured by the eNB, or defined by the standard. In this manner, the higher layer of the UE may instruct the physical layer of the UE to stop partial channel sensing when it receives N continuous event reports from the physical layer of the UE. Or the higher layer of the UE may generate a random number between [0, 1] when it receives N continuous event reports from the physical layer of the UE, and if a random number generated is larger than a specific threshold (the UE may determine the value of the specific threshold by being pre-configured, configured by the eNB, or defined by the standard), the higher layer of the UE will instruct the physical layer of the UE to perform partial channel sensing, and if the random number generated is smaller than the specific threshold, then the higher layer of the UE will set a counter of the event reports received from the physical layer to zero. The UE may determine the value of N by being pre-configured, configured by the eNB, or defined by the standard. The value of N may be correlated to the priority of data transmitted by the UE. For example, the value of N may be positively correlated with the priority of the data transmitted by the UE (the higher the priority of the data is, the larger the N is), and the value of N may include positive infinity and 0. It is to be particularly noted that if the value of the threshold is 0, then the UE is not necessary to perform a CBR measurement; and if the value of the threshold is positive infinity, and if the UE supports the PS resource selection mode, then the UE is not allowed to select transmission resource(s) in the RM resource pool.

If the UE is currently selecting a resource from the PS resource pool through the PS resource selection mode or performs partial channel sensing within the PS resource pool, and receives an instruction of stopping partial channel sensing from the higher layer of the UE in subframe r, then the physical layer of the UE may start to stop partial channel sensing from the subframe r or subframe r+1.

If the UE is performing resource re-selection in the subframe n and according to the instruction from the higher layer, the UE should stop partial channel sensing, then the UE selects the RM resource pool as the transmission resource pool.

Step 430: the UE selects transmission resource(s) according to a corresponding resource selection mode from the transmission resource pool and transmits physical signal(s) through the transmission resource(s).

The UE selects the resource from the transmission resource pool in the same manner as that in the first embodiment.

Figure 5:
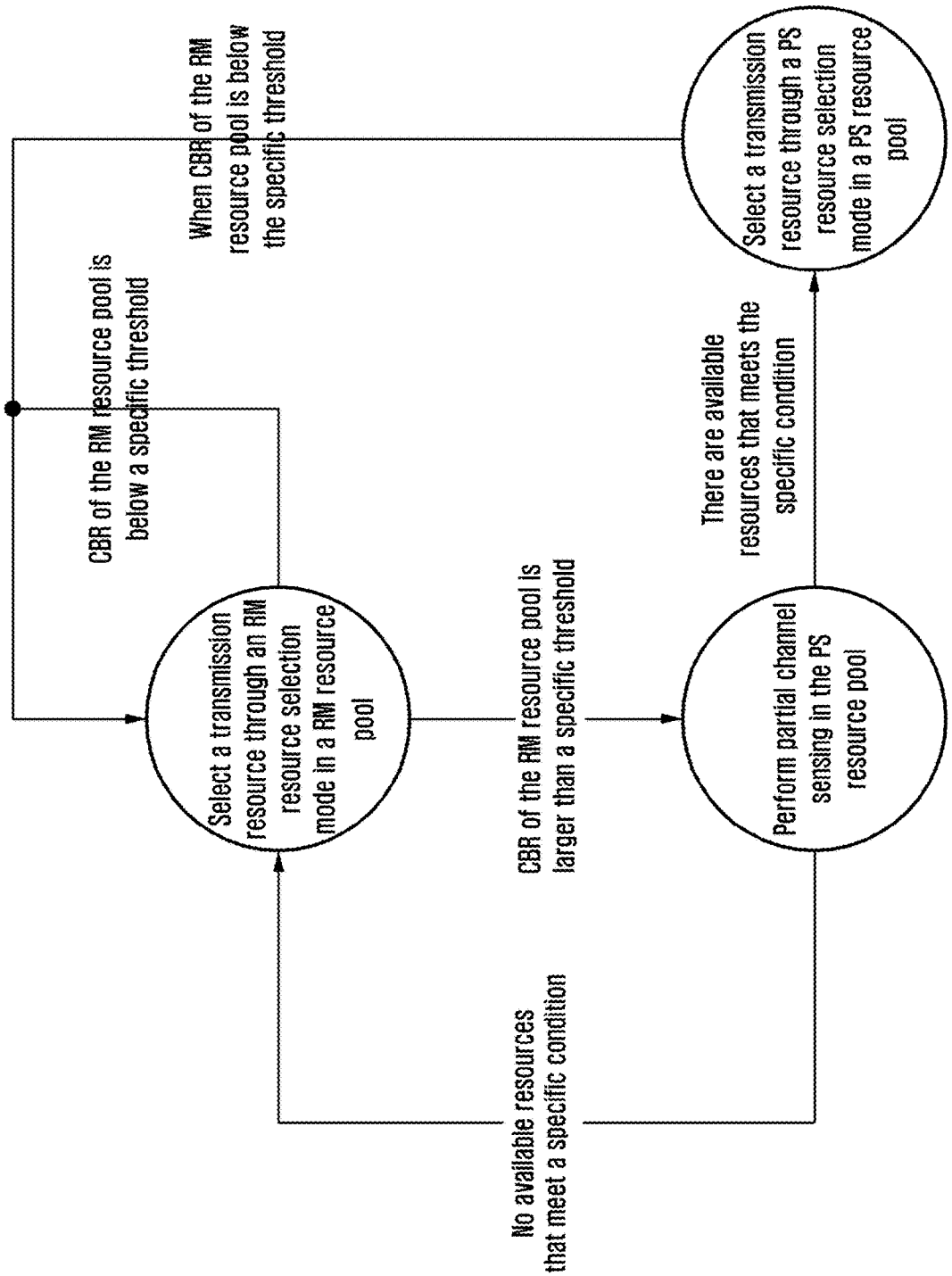
FIG. 5 is a schematic diagram of a method for a UE to select transmission resource(s) provided according to the present disclosure.

According to the methods provided in the first embodiment, the second embodiment and the third embodiment, the resource selection mode of the UE is shown in FIG. 5.

At this point, the present embodiment ends. In the present embodiment, the UE that selects the transmission resource(s) or performs partial channel sensing in the PS resource pool may re-use the RM resource pool as a transmission resource pool at a certain probability after reducing the congestion degree of the RM resource pool in order to reduce the power loss of the UE.

EMBODIMENT 4

In the present embodiment, a UE supports the PS resource selection mode in which the UE performs channel sensing in a PS resource pool according to a specific rule and performs resource selection in the PS resource pool according to a sensing result. The detailed method is as follows: step 510: a UE determines configuration information of one or more transmission resource pools of a current working carrier.

In the embodiment, the UE should at least determine configuration information of a PS resource pool, and configuration information of the PS resource pool should at least include a set of subframes of the PS resource pool and a set of PRBs of the PS resource pool.

The UE may obtain configuration information of the one or more transmission resource pools on the current working carrier by being pre-configured or receiving configuration signaling from an eNB.

Step 520: the UE selects one resource pool as a transmission resource pool from the one or more transmission resource pools in the previous step.

In the present embodiment, if the UE is currently selecting the resource from the RM resource pool through the RM resource selection mode and receives an instruction of partial channel sensing from a higher layer of the UE, or an instruction from the eNB in subframe p, or configuration information of the PS resource pool includes a priority of data allowed to be transmitted by the PS resource pool, and the priority of data to be transmitted by the UE is higher than the priority of data allowed to be transmitted by the PS resource pool, then the physical layer of the UE may start to perform partial channel sensing in the PS resource pool from the subframe p or subframe p+1.

If the UE is currently selecting a resource from the PS resource pool through the PS resource selection mode, the physical layer of the UE may start partial channel sensing from the subframe p when the subframe p meets one or more of the following conditions: (1) condition 1: t+(COUNTER+1)*SAI−100−p<=W, where COUNTER is the value of a resource re-selection counter (SL_RESOURCE_RESELECTION_COUNTER) in the subframe t, subframe t is a subframe where the value of the resource re-selection counter changed most recently, SAI is a resource reservation interval indicated by PSCCH transmitted in the subframe t by the UE or transmitted most recently by the UE (i.e., a value of the resource reservation interval field contained in the PSCCH transmitted in the subframe t or transmitted most recently multiplied by a basic reservation interval $P_{step}$), and W is a size of a partial channel sensing window, and the UE may determine the value of W according to being pre-configured, or configured by the eNB, or defined by the standard, e.g., W=1001, or the largest resource occupancy period allowed by the current resource pool configured by the eNB or pre-configured; (2) condition 2: the subframe p is a first subframe that meets the condition 1 after the resource re-selection counter was initialized most recently; or (3) condition 3: when the random number between [0, 1] generated in the subframe p by the UE is larger than a specific threshold, the UE may determine the specific threshold by being pre-configured, configured by the eNB, or defined by the standard.

For a UE performing partial channel sensing, preferably, the UE should start from the subframe p, and detect signals transmitted by other terminals in y subframes every x subframes, where y≤x, e.g., x=100 and y=10. Preferably, assuming that the UE performs resource re-selection in the subframe n, if there is a resource that meets a specific available resource condition within the resource selection window [n+T1, n+T2], the UE selects a PS resource pool that performs partial channel sensing as a transmission resource pool, or otherwise, the UE may select an RM resource pool as the transmission resource pool. The specific available resource condition may be defined by the standard. For example, if the resource is located in subframe j, where j belongs to [n+T1, n+T2], the UE has detected at least subframes j−M, where M includes 100, 200, 300, 400, 500, 600, 700, 800, 900, and 1000, and the interference from other terminals on the resource estimated from a sensing result is sufficiently low.

Step 530: the UE selects transmission resource(s) according to a corresponding resource selection mode from the transmission resource pool and transmits physical signal(s) through the transmission resource(s).

If the transmission resource pool selected by the UE is an RM resource pool, the UE selects the transmission resources from the transmission resource pool in the same manner as that in the first embodiment. If the transmission resource pool selected by the UE is a PS resource pool, the UE randomly selects the transmission resources of PSCCH and PSSCH from the resources meeting the specific available resource condition within the resource selection window [n+T1, n+T2].

It is to be noted that if the UE selects transmission resource(s) based on partial channel sensing, the UE may directly perform resource re-selection after the resource re-selection counter is reset to zero. That is, the UE skips the operation of generating a random number randomly in the range [0, 1] (i.e., the parameter probResourceKeep defined currently in the standards) and comparing it with the specific threshold according to the standards after the resource re-selection counter is reset to zero, but the UE performs resource re-selection directly.

At this point, the present embodiment ends. With the method of the present embodiment, it is possible to reduce the complexity of resource selection of the UE as much as possible and to reduce the power loss of UE channel sensing.

EMBODIMENT 5

In the present embodiment, a UE supports the PS resource selection mode in which the UE performs channel sensing in a PS resource pool according to a specific rule, and the number of subframes of the UE to perform channel sensing cannot be smaller than a specific value, and finally, the UE performs resource selection in the PS resource pool according to a sensing result. The specific method is as follows:

Step 610: a UE determines configuration information of one or more transmission resource pools of a current working carrier.

In the embodiment, the UE should at least determine configuration information of PS resource pools, and configuration information of a PS resource pool should at least include a set of subframes of the PS resource pool and a set of PRBs of the PS resource pool.

The UE may obtain configuration information of the one or more transmission resource pools on the current working carrier by being pre-configured or receiving configuration signaling from an eNB.

Step 620: the UE selects one resource pool as a transmission resource pool from the one or more transmission resource pools in the previous step.

In the present embodiment, if the UE is currently selecting a resource through the RM resource selection mode within a RM resource pool and receives an instruction of partial channel sensing from a higher layer of the UE or an instruction from an eNB in a subframe p, or if configuration information of the PS resource pool includes a priority of data allowed to be transmitted by the PS resource pool, and a priority of data to be transmitted by the UE is higher than the priority of data allowed to be transmitted by the PS resource pool, the physical layer of the UE may start to perform partial channel sensing in the PS resource pool starting from the subframe p or a subframe p+1. If the higher layer of the UE instructs the physical layer of the UE to perform partial channel sensing in the PS resource pool, then the higher layer of the UE may further notify the physical layer of the UE of an assumed period of generating data packets when performing partial channel sensing.

If the UE is currently selecting a resource through the PS resource selection mode within a PS resource pool, and the physical layer of the UE may perform channel sensing in a subframe q if the subframe q meets one or more of the following conditions.

Condition 1: subframe q+k belongs to a subframe set [T+M1, T+M2]. M1 and M2 are determined by the UE. However, the number of subframes in the subframe set [t+(COUNTER+1)*SAI+M1, t+(COUNTER+1)*SAI+M2] should be not less than Y, and the UE obtains a value of Y through being configured by the eNB or pre-configured; k belongs to a set K, and the UE determines elements in the set K by receiving configuration information from the eNB or by being pre-configured, and the elements in the set K may be used to represent a resource reservation interval supported by the current resource pool; and according to a first T determination method in the present disclosure, T is determined by the physical layer of the UE, where T=t+(COUNTER+1)*SAI+M1, COUNTER is a value of a resource re-selection counter (SL_RESOURCE_RESELECTION_COUNTER) in a subframe t, and the subframe t is a subframe where a most recent data packet arrives, or a subframe where the value of the resource re-selection counter changes most recently, or a subframe where resource re-selection is performed most recently, or the subframe p or subframe p+1; SAI is a resource reservation interval (i.e., a value of a resource reservation interval field in the PSCCH most recently transmitted or transmitted in the subframe t multiplied by a basic reservation interval $P_{step}$) indicated by a PSCCH most recently transmitted by the UE, or an assumed period of generating data packets instructed by the higher layer of the UE when performing partial channel sensing. According to a second T determination method in the present disclosure, T is determined by an MAC layer of the UE and preferably the value of T is notified to the physical layer of the UE before T-1000. The MAC layer of the UE may determine T in the same manner as that in the first T determination method, or depending on an implementation method of the UE.

Condition 2: a random number between [0, 1] generated by the physical layer of the UE or the MAC layer of the UE at a certain time after the resource re-selection last time is greater than a certain threshold, and the UE may determine a value of the certain threshold (i.e., the parameter probResourceKeep defined in the current standards) by being pre-configured, configured by an eNB, or defined by a standard. The value of this threshold is used to configure a probability that the UE will continue to use the currently selected resource.

Condition 3: the UE does not transmit any signal on the carrier where the PS resource pool is located in the subframe q.

For a UE using the PS resource selection mode, if the UE performs resource re-selection in the subframe n, if the number of subframes from a subframe range [n+Δ, t+(COUNTER+1)*SAI+M2] that belong to a set [t+(COUNTER+1)*SAI+M1, t+(COUNTER+1)*SAI+M2] is not less than Y, the UE selects a PS resource pool that performs partial channel sensing as the transmission resource pool, or otherwise, the UE may select the RM resource pool as the transmission resource pool.

Step 630: the UE selects transmission resource(s) from the transmission resource pool according to a corresponding resource selection mode and transmits physical signal(s) through the transmission resource(s).

If the transmission resource pool selected by the UE is an RM resource pool, the UE selects the resource from the transmission resource pool in the same manner as that in the first embodiment. If the transmission resource pool selected by the UE is a RS resource pool, then the UE randomly selects transmission resources of PSCCH and PSSCH from resources that meet a specific available resource condition from an intersection of a set [n+, t+(COUNTER+1)*SAI+M2] and a set [t+(COUNTER+1)*SAI+M1, t+(COUNTER+1)*SAI+M2]. The resources that meet the specific available resource condition may be all resources that belong to the PS resource pool in the intersection, or resources that have an interference level low enough according to a sensing result and have not been occupied by other UEs that have a higher priority of transmitting data.

It is to be noted that if the UE selects transmission resource(s) based on partial channel sensing, the UE may directly perform resource re-selection after the resource re-selection counter is reset to zero. That is, the UE skips the operation of generating a random number randomly in the range [0, 1] (i.e., the parameter probResourceKeep defined currently in the standards) and comparing it with the specific threshold according to the standards after the resource re-selection counter is reset to zero, but the UE performs resource re-selection directly.

At this point, the present embodiment ends. In this embodiment, the number of subframes in which the UE performs channel sensing is constrained in comparison with the embodiment 4, so that a sufficiently sensed subframe is selected as a candidate subframe when the UE performs resource re-selection.

Figure 6:
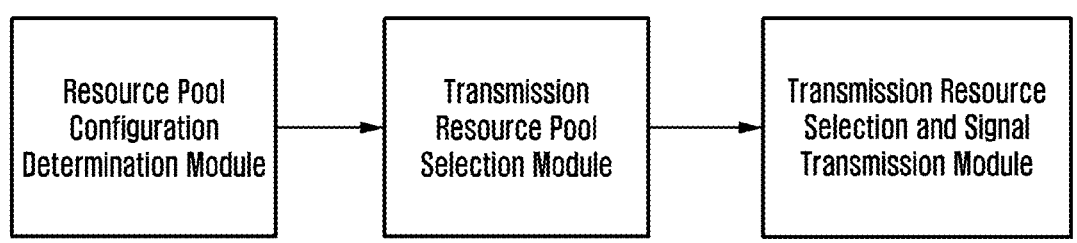
FIG. 6 is a structure diagram of an apparatus for selecting a resource provided according to the present disclosure.

The present disclosure also discloses a resource selection apparatus in V2X communications, a structure of the apparatus is shown in FIG. 6, including: a resource pool configuration determination module, a transmission resource pool selection module and transmission resource(s) selection and signal transmission module, in which:

The resource pool configuration determination module determines configuration information of one or more transmission resource pools of a current work carrier.

The transmission resource pool selection module selects a transmission resource pool according to statuses of candidate resource pools and a status of channel sensing.

The transmission resource selection and signal transmission module selects transmission resource(s) from the transmission resource pool and transmits physical signal(s) through the transmission resource(s).

Figure 7:
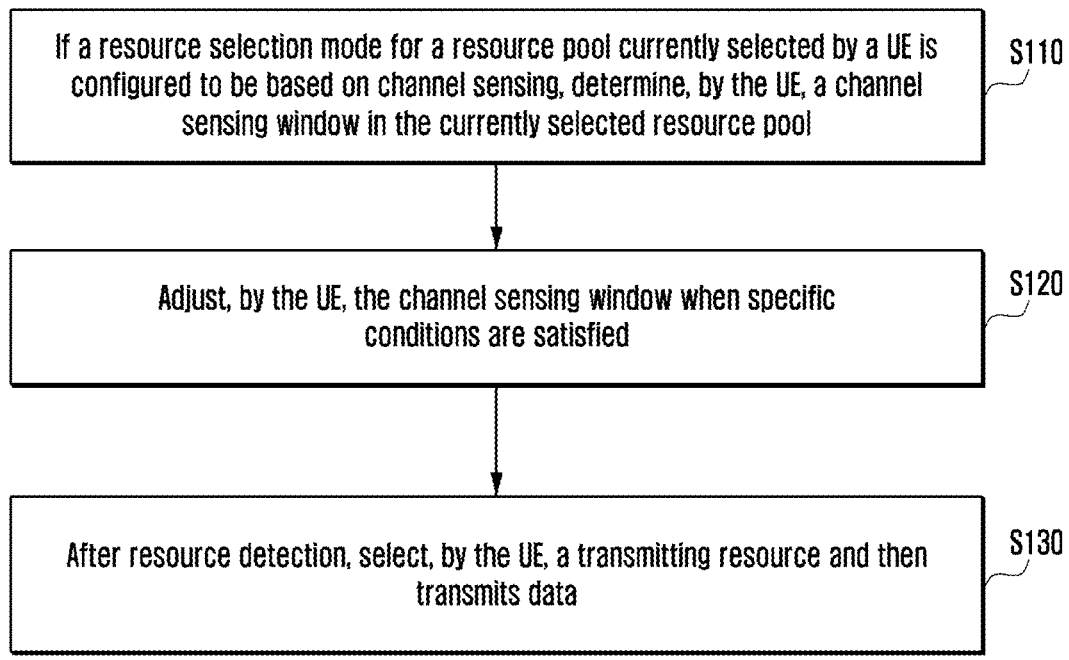
FIG. 7 is a flowchart of implementation steps of technical solutions according to the present disclosure.

In the V2X communication, if a UE transmitting data is a P-UE, since the UE is unable to bear a long time of channel sensing due to the limitations of the power supply capability of the battery, the mechanism of selecting a transmitting resource based on 1 s channel sensing defined in the 3GPP at present is not applicable to the P-UE. In contrast, if a random resource selection mechanism is adopted by focusing on the reduction in power loss of the UE, the performance of the V2X communication system may be influenced, particularly when there are a large number of P-UEs. Accordingly, the present disclosure provides a method for transmitting data in V2X communication, as shown in FIG. 7, including the following steps:

Step S110: If a resource selection mode for a resource pool currently selected by a UE is configured to be a resource selection mode based on channel sensing, the UE determines a channel sensing window within the currently selected resource pool.

The resource pool currently selected by the UE can be all time-frequency resources on the current working carrier, or a subset of all time-frequency resources on the current carrier. A way of determining configuration of a resource pool and selecting a resource pool by the UE is not limited in the present disclosure. Hereinafter, unless otherwise stated, the subframe refers to a subframe within a subframe set of the resource pool currently selected by the UE.

The UE can determine the resource selection configuration of the currently selected resource pool according to a signaling from an eNB or pre-configuration. Either a random resource selection mode or a resource selection mode based on channel sensing can be enabled within the resource pool. If the random resource selection mode is enabled, the UE can directly execute step S130.

The channel sensing window of the UE consists of W2 subframes belonging to the selected resource pool within P ms, and is repeated at a period of P. Wherein, the value of P is defined by the standard or configured by the eNB or preconfigured into a storage device of the UE, and denotes a minimum period granularity for a transmitting UE to semi-statically occupy resources in the current V2X communication environment, for example, P=100 ms. Or P can be a minimum granularity of the period of resource occupancy of all UEs in the current resource pool and a minimum delay requirement of the current service of the UE. For example, if the minimum granularity of the period of resource occupancy of all UEs in the current resource pool is 200 ms, that is, the period of resource occupancy may be 200 ms, 400 ms, 1 s, and the current delay requirement of the UE is 100 ms, the repetition period of the channel sensing window of the UE should be 100 ms. The minimum value Wm of W2 can be defined by the standard, configured by the eNB, preconfigured into a storage device of the UE, or determined by an implementation scheme of the UE, where Wm≤P, for example, Wm=10 ms.

W2 subframes in the channel sensing window can be distributed within P ms in any way. Preferably, W2 subframes in the channel sensing window are successive in time.

Step S120: When specific conditions are satisfied, the UE adjusts the channel sensing window.

The specific conditions are defined by the standard. The specific conditions can be, but not limited to: resources within the current channel sensing window are overloaded, or the proportion of occupied resources within the current channel sensing window is higher than a certain threshold, or a relevant indication from the eNB is received, or the network state changes. When the specific conditions are not satisfied, the UE can directly execute step S130. In addition, the absolute time for executing the step S120 may be later than the step S130.

When adjusting the channel sensing window, the UE can expand and shrink the channel sensing window. The size of the expanded channel sensing window (refers to the number of subframes within the channel sensing window, similarly hereinafter) will not be limited in the present disclosure. It is to be specifically noted that the UE's operation of expanding the channel sensing window can be executed together with the step S110. In other words, the channel sensing window is determined according to the expanded size. When the UE shrinks a channel selection window, it should be ensured that there are at least Wm subframes having experienced more than I times of channel sensing within the shrunken channel sensing window, where I is defined by the standard and denotes the minimum number of detections that should be made for a resource within the channel sensing window so as to obtain a valid detection result for the resource, for example, I=10.

When adjusting the channel sensing window, the UE can also directly change the position of the channel sensing window. The size of the channel sensing window after changing the position of the channel sensing window should be not less than Wm.

Step S130: After resource detection, UE selects a transmitting resource and then transmits data.

The UE should select a transmitting resource within a channel selection window first. If the UE selects a resource in a subframe n, the UE determines a channel selection window according to the last channel sensing window before the subframe n. For any subframe m within the channel selection window, the following conditions must be satisfied: a subframe m−P belongs to the channel sensing window for the UE; and, the UE has performed channel sensing in all subframes with an index m−i*P, where i=1, 2, . . . , I; and, subframes with an index m−n>c_min, where c_min is a specific value, and this value can be defined by the standard, for example, c_min=2 ms; and, subframes with an index n−(m−P)≥b, where b is a specific value, and this value can be a value defined by the standard, for example, b=1.

If there are no available resources within the channel selection window, the UE can randomly select a transmitting resource within a range satisfying the delay requirements.

To easily understand the present disclosure, the technical solutions of the present disclosure will be further described below with reference to specific applications, by taking an inter-equipment interaction mode as an example.

EMBODIMENT 6

In this embodiment, the UE uses W2 as the size of the channel sensing window, where W2≤Wm. In a subframe n, the UE determines a channel selection window corresponding to the channel sensing window, and then selects a transmitting resource within the channel selection window. In accordance with the method in this embodiment, the UE can autonomously determine the size and position of the channel sensing window and when to adjust the channel sensing window. However, the UE needs to ensure that, at any point of time, there are at least Wm subframes having experienced more than I times of channel sensing within the resource detection window, so that the UE always uses a valid result of channel sensing as the basis for channel selection. The specific method is as follows.

Step S210: A UE determines a channel sensing window.

In this embodiment, the size W2 of the channel sensing window should be not less than Wm, and the value of W2 can be changed during the whole channel sensing process. In other words, the UE can remove some subframes from the channel sensing window, or can also contain adding new subframes into the channel selection window. However, when the UE removes subframes from the channel sensing window, the number of subframes, which have experienced more than I times of channel sensing, within the channel sensing window after the removal should be not less than Wm. The UE can randomly select W2 subframes from the channel sensing window within a period of P, and the W2 subframes can be distributed successively in time.

Step S220: In a subframe n, the UE selects a transmitting resource within the corresponding channel selection window according to the result of channel sensing.

In this embodiment, the UE should ensure that, at any point of time (except I*P after the UE is activated, or I*P after the V2X communication function of the UE is activated), there are always at least Wm subframes within the channel sensing window having experienced more than I times of channel sensing.

A subframe m within the channel selection window of the UE should satisfy the following conditions: a subframe m−P belongs to the channel sensing window for the UE; and, the UE has performed channel sensing in all subframes with an index m−i*P, where i=1, 2, . . . , I; and, subframes with an index m−n>c_min, where c_min is a specific value, and this value can be defined by the standard, for example, c_min=2 ms; and, subframes with an index n−(m−P)≥b, where b is a specific value, and this value can be a value defined by the standard, for example, b=1.

As an implementation of this embodiment, the UE selects a transmitting resource only within the determined channel selection window. As another implementation of the present disclosure, if the energy (obtained by prediction according to the result of channel sensing) of resources within the current channel selection window is higher than a certain threshold, the UE randomly selects a transmitting resource between subframes n+c_min and n+d_max, where d_max is the maximum delay tolerance for the current service. As still another implementation of the present disclosure, if the energy (obtained by prediction according to the result of channel sensing) of resources within the current channel selection window is higher than a certain threshold, the UE randomly selects a transmitting resource from subframes not belonging to the channel selection window between subframes n+c_min and n+d_max.

Figure 8:
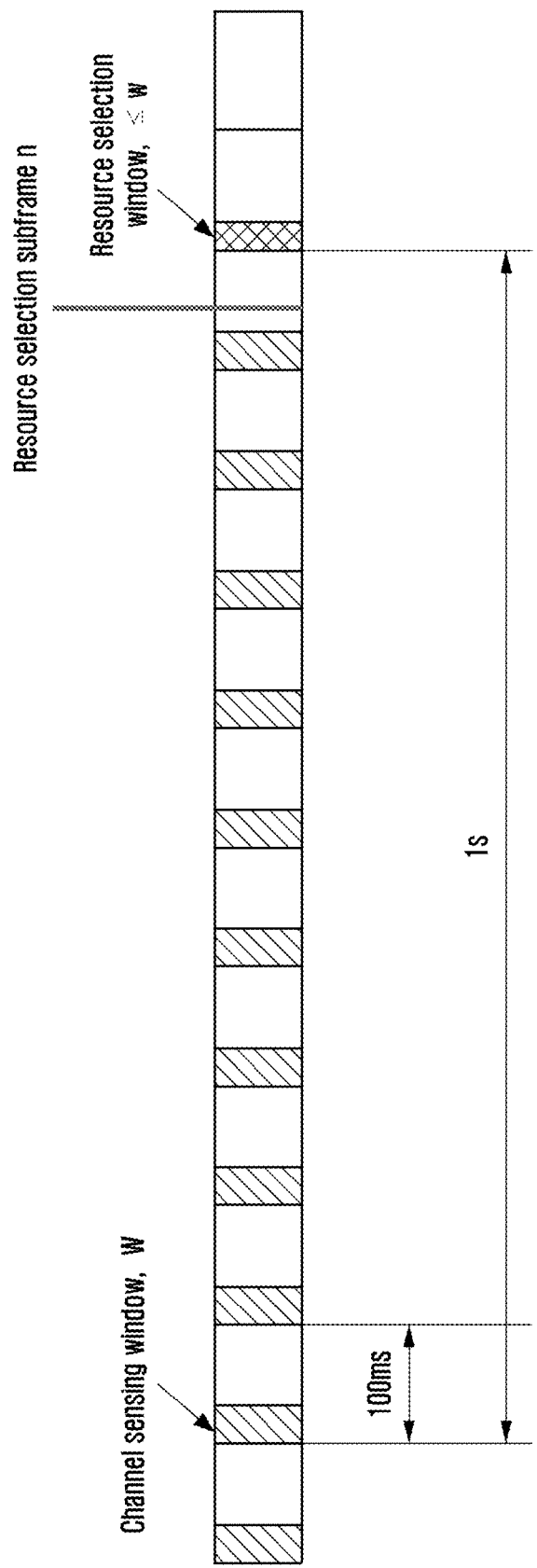
FIG. 8 is a schematic diagram of a possible distribution of a channel sensing window and a channel selection window in Embodiment 6.

In this embodiment, FIG. 8 shows a possible distribution of the channel sensing window and the channel selection window. In this example, P=100 ms, and I=10.

Now, this embodiment ends. In this embodiment, only the minimum value of the size of the resource detection window is limited; and the UE can perform channel sensing according to its own capability, and ensure that, at any point of time for resource selection, there are resources having experienced more than I times of channel sensing which are available for determination of the channel selection window. This method can minimize the standard workload under the premise of ensuring the effectiveness of channel sensing.

EMBODIMENT 7

In this embodiment, the UE uses Wm as the size of the channel sensing window; and, when specific conditions are satisfied, the UE changes the position of the channel sensing window, and the channel sensing window with the changed position has the same size as the original channel sensing window and can be overlapped with the original channel sensing window. The UE determines a channel selection window according to the channel sensing window, and then selects a transmitting resource within the channel selection window. Since the UE always performs channel sensing by using the channel sensing window having a size of Wm, the energy loss of the UE can be reduced to the largest extent. However, after the UE changes the channel sensing window, the UE may need to perform resource selection before performing I times of channel sensing on new resources within the channel sensing window. In this case, new resources within the channel sensing window cannot be used as references for channel selection. Accordingly, if the UE is unable to determine the channel selection window or there are no available resources within the channel selection window, the UE can randomly select a transmitting resource within a range satisfying the delay requirements. The specific method is as follows.

Step S310: A UE determines a channel sensing window.

In this embodiment, the size of the channel selection window is Wm, and Wm subframes can be distributed successively in time.

Step S320: When specific conditions are satisfied, the UE adjusts the channel sensing window.

The specific conditions are defined by the standard. The specific conditions can be, but not limited to: resources within the current channel sensing window are overloaded, or the proportion of occupied resources within the current channel sensing window is higher than a certain threshold, or a relevant indication from the eNB is received, or the network state changes. When the specific conditions are not satisfied, the UE can directly execute the step S330. In addition, the absolute time for executing the step S320 may be later than the step S330.

Figure 9:
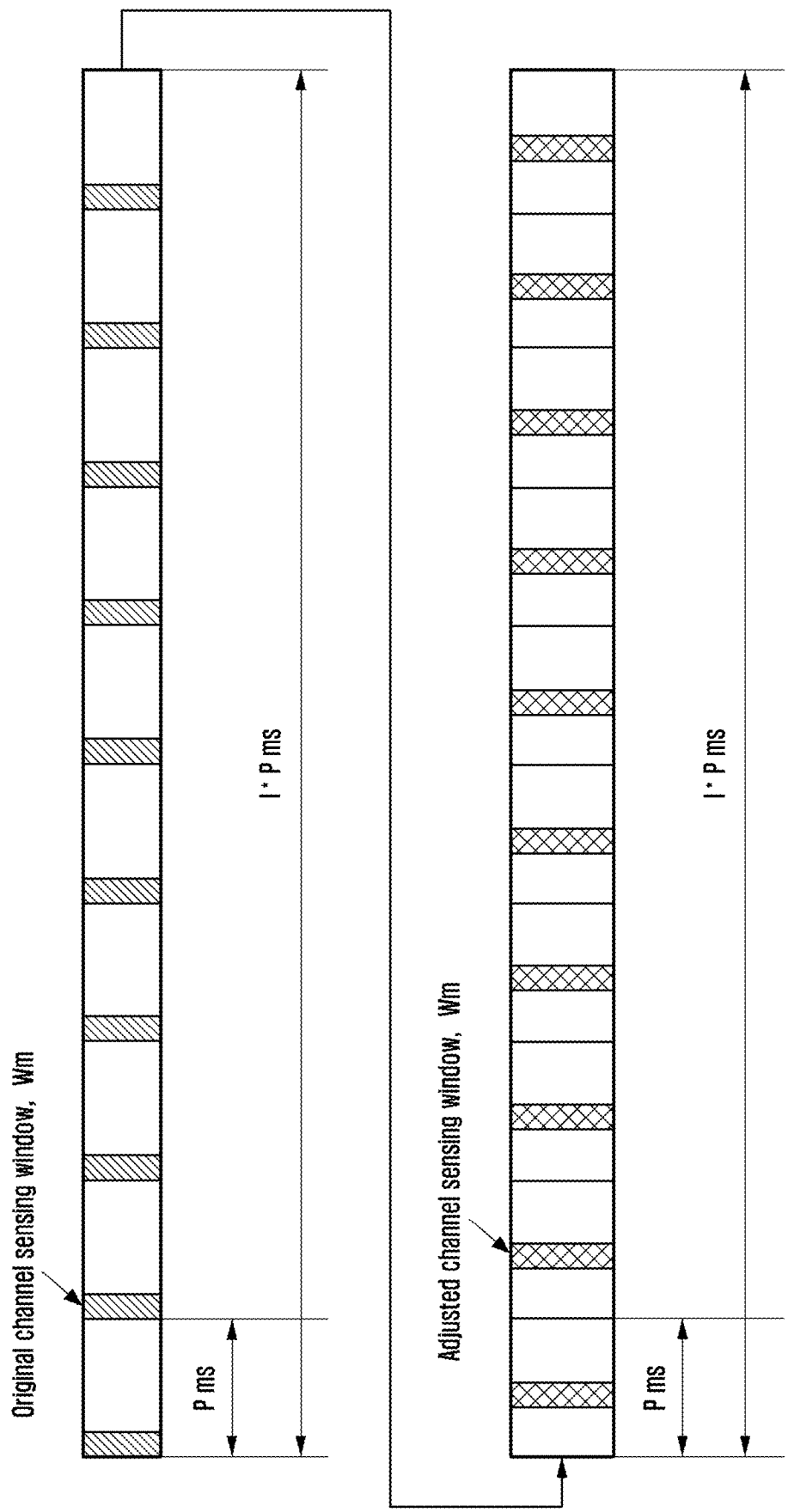
FIG. 9 is a schematic diagram of a method for changing the channel sensing window in Embodiment 7.

In this embodiment, the UE directly changes the position of the channel sensing window, and the channel sensing window after changing the position of the channel sensing window still has a size of Wm and can be overlapped or not completely overlapped with the original channel sensing window, as shown in FIG. 9.

Step S330: In a subframe n, the UE selects a transmitting resource within the corresponding channel selection window according to the result of channel sensing.

In this embodiment, the UE can select a transmitting resource within the channel sensing window, wherein a subframe m for the UE within the channel sensing window should satisfy the following conditions: a subframe m−P belongs to the channel sensing window for the UE; and, the UE has performed channel sensing in all subframes with an index m−i*P, where i=1, 2, . . . , I; and, subframes with an index m−n>c_min, where c_min is a specific value, and this value can be defined by the standard, for example, c_min=2 ms; and, subframes with an index n−(m−P)≥b, where b is a specific value, and this value can be a value defined by the standard, for example, b=1.

If the number of subframes within the channel selection window is 0 (that is, there are no subframes having experienced I times of channel sensing within the channel sensing window), the UE randomly selects a transmitting resource between subframes n+c_min and n+d_max.

If the energy (obtained by prediction according to the result of channel sensing) of resources within the current channel selection window is higher than a certain threshold, a method of selecting a transmitting resource by the UE is the same as Embodiment 6.

Now, this embodiment ends. In this embodiment, in any case, the size of the channel sensing window for the UE is Wm. If the UE needs to perform resource selection after the UE adjusts the channel sensing window, and the resources within the new channel sensing window have not experienced enough times of detection, the UE can select a transmitting resource by random selection. Therefore, this method can reduce the energy loss of the UE to the maximum possible extent.

EMBODIMENT 8

In this embodiment, the UE uses Wm as the size of the channel sensing window. When specific conditions are satisfied, the UE can expand the size of the channel sensing window. The expanded channel sensing window must be a superset of the original channel sensing windows. Before expanding the channel sensing window by I*P, the UE needs to perform channel sensing on both the resources within the original channel sensing window and newly introduced resources, so as to ensure that there is still a valid result of channel sensing to be used as a reference for channel selection before I times of channel sensing are performed on the new resources within the channel sensing window. After the channel sensing window is expanded by I*P ms, the UE should shrink the channel sensing window to Wm. The specific method is as follows.

Step S410: A UE determines a channel sensing window.

In this embodiment, the size of the channel selection window is Wm, and Wm subframes can be distributed successively in time.

Step S420: When specific conditions are satisfied, the UE adjusts the channel sensing window.

The specific conditions are defined by the standard. The specific conditions can be, but not limited to: resources within the current channel sensing window are overloaded, or the proportion of occupied resources within the current channel sensing window is higher than a certain threshold, or a relevant indication from the eNB is received, or the network state changes. When the specific conditions are not satisfied, the UE can directly execute the step S430. In addition, the absolute time for executing the step S420 may be later than the step S430.

Figure 10:
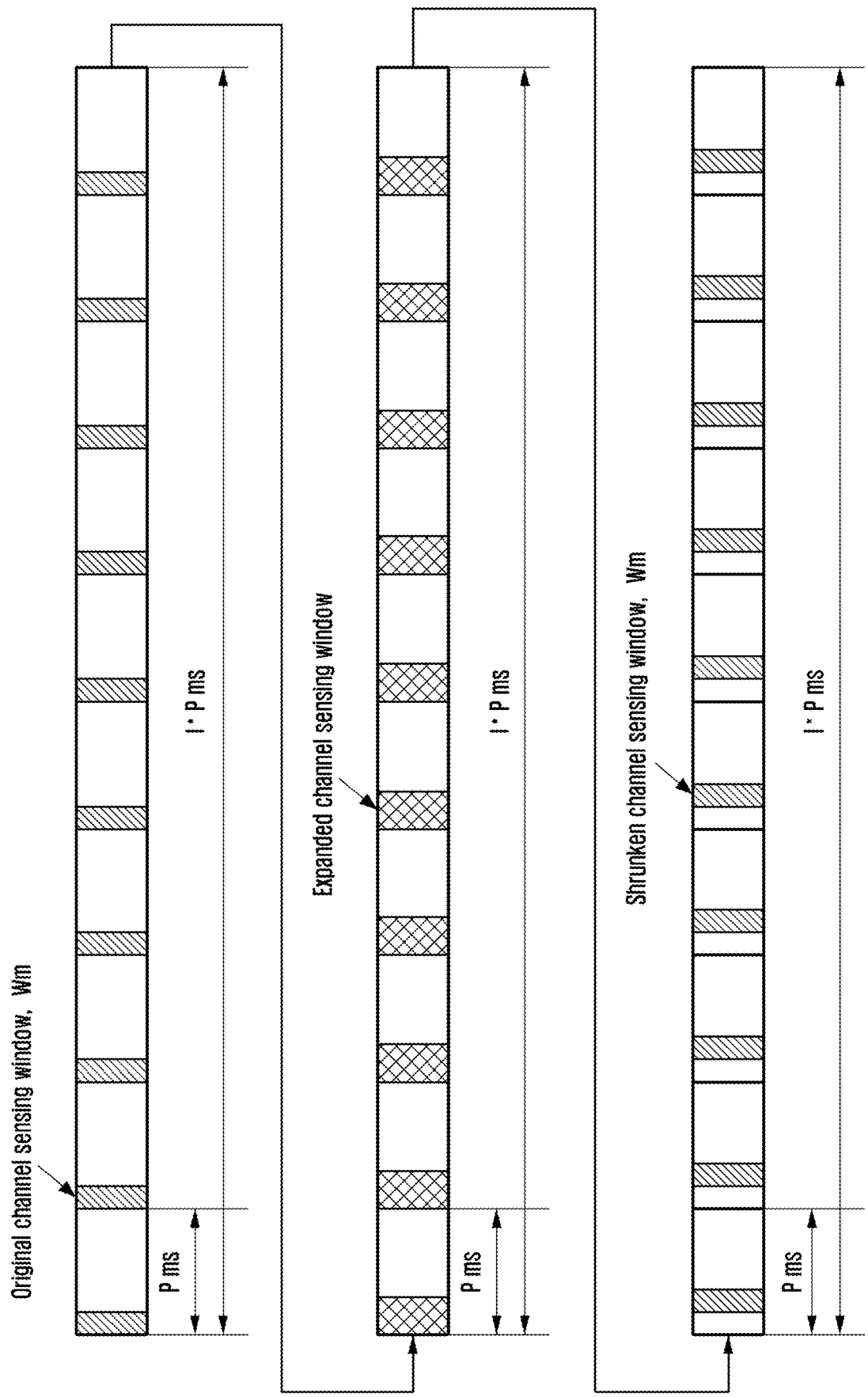
FIG. 10 is a schematic diagram of continuously expanding the channel sensing window and shrinking the channel sensing window in Embodiment 8.
Figure 11:
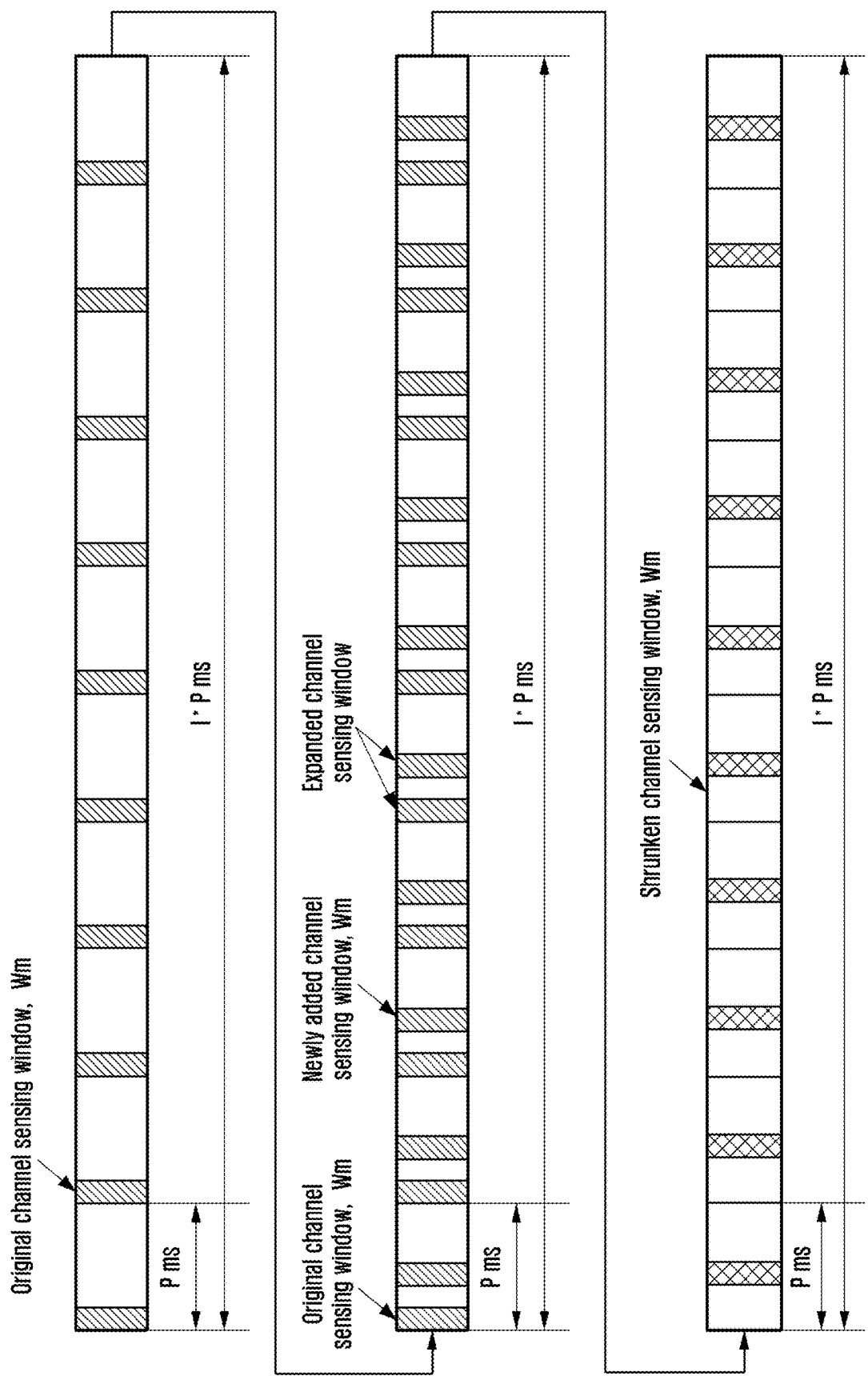
FIG. 11 is a schematic diagram of discontinuously expanding the channel sensing window and shrinking the channel sensing window in Embodiment 8.

In this embodiment, subframes contained in the expanded channel sensing window must be a superset of the original channel sensing windows. The subframes within the expanded channel sensing window can be distributed successively in time, as shown in FIG. 10; or the channel sensing window expanded by the UE contains the original channel sensing window and another newly added channel sensing window still having a size of Wm, and the position of the new channel sensing window is not overlapped with the original channel sensing window, as shown in FIG. 11.

After the UE expands the channel sensing window by I*P, the channel sensing window should be shrunken to Wm, and subframes within the shrunken channel sensing window can be still distributed successively. If the specific conditions for adjusting the channel sensing window by the UE are still satisfied in this case, the UE should readjust the channel sensing window by the same method.

Step S430: In a subframe n, the UE selects a transmitting resource within the corresponding channel selection window according to the result of channel sensing.

In this embodiment, the UE can select a transmitting resource within the channel selection window, wherein a subframe m for the UE within the channel selection window should satisfy the following conditions: a subframe m−P belongs to the channel sensing window for the UE; and, the UE has performed channel sensing in all subframes with an index m−i*P, where i=1, 2, . . . , I; and, subframes with an index m−n>c_min, where c_min is a specific value, and this value can be defined by the standard, for example, c_min=2 ms; and, subframes with an index n−(m−P)≥b, where b is a specific value, and this value can be a value defined by the standard, for example, b=1.

If the energy (obtained by prediction according to the result of channel sensing) of resources within the current channel selection window is higher than a certain threshold, a method of selecting a transmitting resource by the UE is the same as Embodiment 6.

Now, this embodiment ends. In this embodiment, the UE temporarily expands the size of the channel sensing window only during the adjustment of the channel sensing window, so the increase in the energy loss will occur only for a short period of time when compared to that in Embodiment 7. During the expansion of the channel sensing window, the UE continuously detects resources within the original channel sensing window. This can ensure that, at any point of time, there are at least Wm subframes having experienced more than I times of channel sensing within the channel sensing window. Consequently, at any point of time, the UE can determine an effective channel selection window, and this is advantageous to ensure the quality of the transmitting resource selected by the UE.

Figure 12:
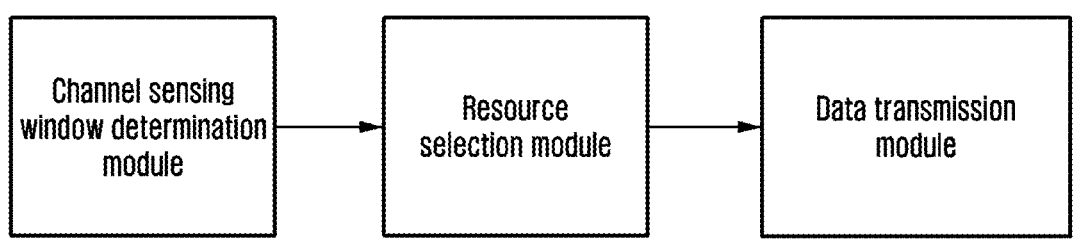
FIG. 12 is a structural diagram of the equipment according to the present disclosure

The present disclosure further discloses an equipment for transmitting data in V2X communication. FIG. 12 shows a composition structure of the equipment, including a channel sensing window determination module, a resource selection module and a data transmission module, wherein: the channel sensing window determination module is configured to determine the position, size, and repetition period of a channel sensing window, and adjust the channel sensing window when specific conditions are satisfied; the resource selection module is configured to select a transmitting resource according to a result of channel sensing; and the data transmission module is configured to transmit data by using the selected transmitting resource.

Figure 13:
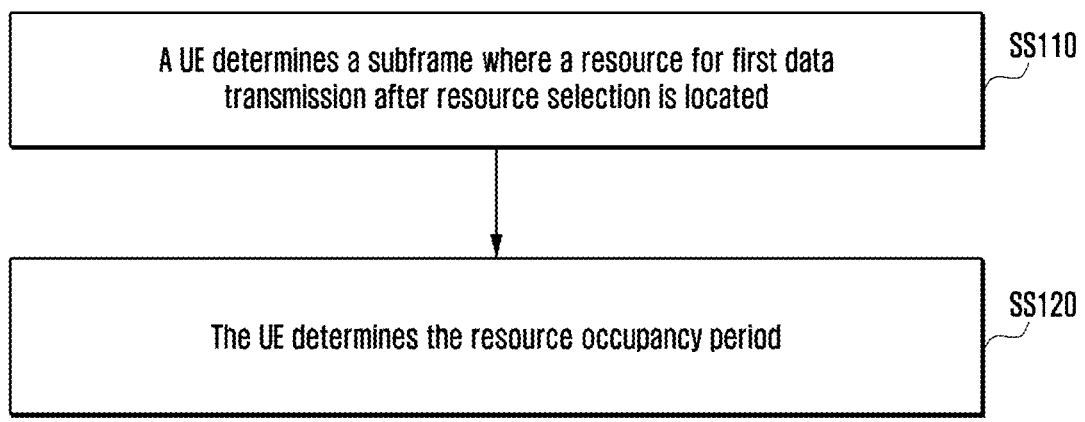
FIG. 13 is a flowchart illustrating a resource selecting method in V2X communication according to the present disclosure.

In V2X communication, a generation period of a V2X data packet is determined by a UE state, the period may be any value in [100 ms,1 s]. According to a resource selection mechanism based on channel sensing in V2X communication, the UE needs to reserve a transmission resource according to a specific period, the specific period may be integral multiple of a minimum period granularity, thus, the generation period of the V2X data packet and the resource occupancy period cannot ensure totally equal to each other in a normal condition. A difference between them causes that a distance between generation time of the V2X data packet and a V2X transmission resource (i.e., a resource for transmission of a V2X data packet) is larger than a time delay requirement of the V2X data packet, and finally causes that the UE frequently performs resource reselection, thereby impacting performance of a V2X communication system. Thus, the present disclosure provides a resource selecting method in V2X communication, as shown in FIG. 13, for a transmission UE. The method includes procedures as follows.

At block SS110, the UE determines a subframe where a resource for first data transmission after resource selection is located.

In the present disclosure, it is assumed that the V2X UE performs resource selection in subframe n, and the UE selects an idle frequency resource for transmission of the first data packet in subframe n+d. In addition, without loss of generality, in the present disclosure, it is assumed that each data packet is only transmitted once, and is not retransmitted. For a condition that retransmission exists, a resource for the first transmission of each data packet and a resource for each retransmission may be independently determined according to a method in the present disclosure.

In the present disclosure, d may be selected according to at least one of three criterions as follows:

1. in a condition of satisfying a data packet time delay requirement, the number of times of occupying a same frequency resource is largest;

2. collision among different UEs is smallest; and 3. interference to high priority data is smallest. At block SS120, the UE determines the resource occupancy period.

The resource occupancy period is denoted as i*P. In the present disclosure, it is assumed that P is a value defined in specification, e.g., P=100 ms or 50 ms. i*P is selected according to at least one of two criterions as follows:

1. nearest to the data packet generation period (i.e., a difference with the data packet generation period is smallest); and 2. the number of times of occupying a same frequency resource is largest.

During the total resource reservation process, i may be a fixed value, or i may be changed.

It should be specially described that an implementing order of blocks SS110 and SS120 is not limited in the present disclosure.

In order to facilitate understanding of the present invention, in conjunction with detail application conditions, technical solutions of the present disclosure are further described in detail below based on interactive modes among devices.

EMBODIMENT 9

In the embodiment, a UE firstly selects a resource occupancy period i*P nearest to a data packet generation period according to a data packet generation period, and then selects a subframe n+d of a resource for first data transmission according to the selected resource occupancy period, which satisfies that the number of times of occupying a same frequency resource is largest, collision among UEs is smallest, and/or, impact for a high priority UE is avoided. In the embodiment, before the resource is reselected, the resource occupancy period is not changed. The detail method is described as follows.

At block SS210, the UE determines the frequency resource occupancy period i*P.

In the embodiment, a value of P is defined in specification, a value of i is determined according to the following formula: i=round ($P_{pkt}$/P), round( ) expresses round to a nearest integer, e.g., round(2.4)=2, round(2.5)=3. $P_{pkt}$ expresses a data packet generation period of the UE, a communication module of the UE obtains a value of $P_{pkt}$ through higher layer (e.g., an application layer) indication information of the UE, a detail way that the UE obtains the $P_{pkt}$ through the communication module is not limited in the present disclosure.

At block SS220, the UE determines the subframe n+d of the resource for the first data transmission according to the value of i*P.

Figure 14:
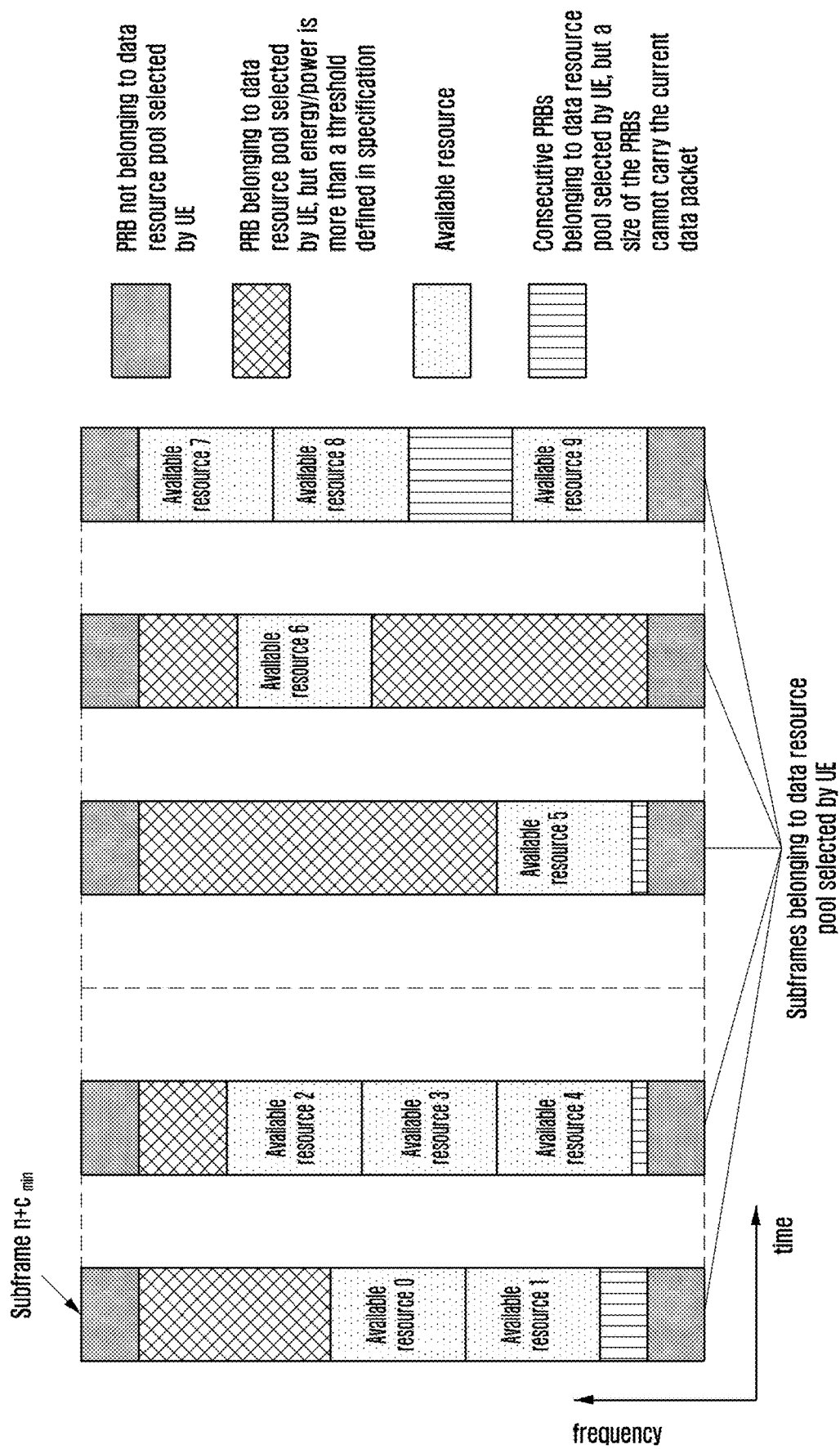
FIG. 14 is a schematic diagram illustrating available resources of way 1A according to Embodiment 9 of the present disclosure.

If $P_{pkt} \leq i*P$ (or $P_{pkt} < i*P$), according to an implementing method of the embodiment (hereinafter, referred to as method 1A), the UE randomly selects a resource from first k available resources in a resource selection window, a distance between the subframe where the resource is located and the subframe n is d. In method 1A, an available resource is at least one consecutive PRB in a subframe, and satisfies criterions as follows: at least one consecutive PRB in a frequency domain available to carry a size of the current data packet in a subframe, and both the subframe and the at least one PRB belong to a data resource poll currently selected by the UE. In addition, energy and power received on the at least one PRB (obtained through channel sensing) is lower than a threshold defined in specification. Available resources in a same subframe are not overlapped, and available resources in multiple subframes are sorted from the frequency domain to the time domain, available resources 0 to 9 in FIG. 14. The available resources may be sorted according to another order, and the order way from the frequency domain to the time domain is only an exemplary example for description.

k=min(A, K), a value of A is defined in specification, e.g., A=10, K expresses the total number of available resources in a subframe range [n+$c_{min}$, n+$d_{max}$). The resource selection window is time frequency resources between a subframe n+$c_{min}$ and a subframe n+$d_{max}$, $c_{min}$ expresses a minimum time used for recoding a control channel and a data channel, e.g., $c_{min}$ is equal to 4, $d_{max}$ expresses a requirement of largest time delay for data transmission, e.g., $d_{max}$ is equal to 100, $c_{min}$ is defined in specification, $d_{max}$ may be defined in specification, or may be determined according to the time delay requirement for a current service. If there is no special description, the "resource selection window" in description below is equivalent to "time frequency resources between a subframe n+$c_{min}$ and a subframe n+$d_{max}$".

If $P_{pkt} \leq i*P$ (or $P_{pkt} < i*P$), according to another implementing method in the embodiment (hereinafter, referred to as 1B), the UE firstly determines a location of a reservation resource between a subframe n+$c_{min}$ and a subframe n+$d_{max}$, and then randomly selects a resource in first k available resources, a distance between the subframe where the resource is located and a subframe n is d. The reservation resource is a resource reserved for a high priority service or an aperiodic service, and includes a consecutive R PRBs (R is more than or equal to 1), and the subframe and the R PRBs belongs to the data resource pool currently selected by the UE. In addition, energy and power received on the R PRBs (obtained through channel sensing) is lower than a threshold defined in specification, a value of R is defined in specification, e.g., R=20.

Figure 15:
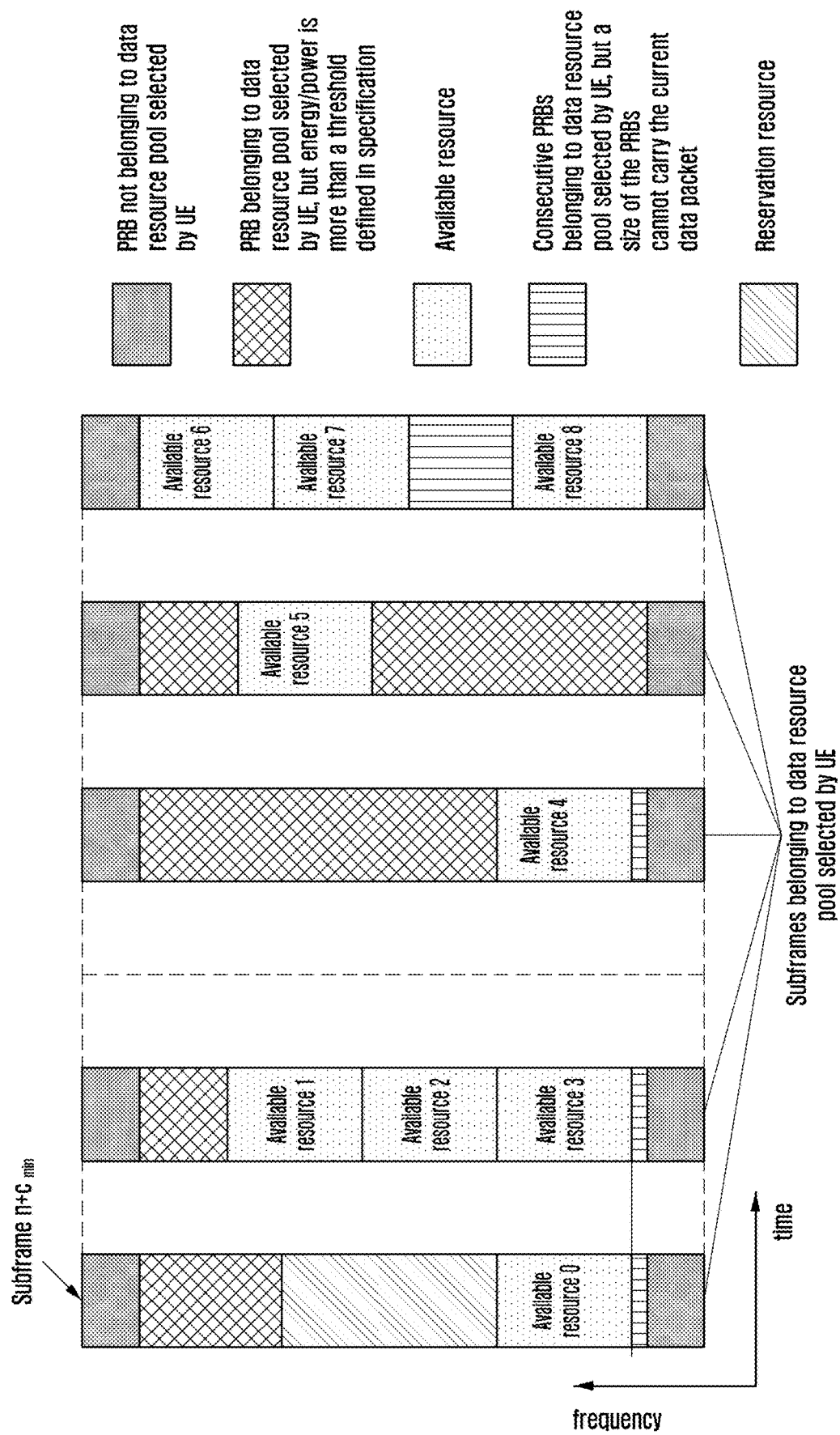
FIG. 15 is a schematic diagram illustrating available resources of way 1B in Embodiment 9 of the present disclosure.

In method 1B, the available resource is at least one consecutive PRB in frequency domain available to carry a size of a current packet in a subframe, and both the subframe and the at least one PRB belong to the data resource pool currently selected by the UE, and energy and power received on the at least one PRB (obtained through the channel sensing) is lower than a threshold defined in specification, in addition, each of the at least PRB is not overlapped with the reservation resource. The available resources in a same subframe are not overlapped with each other, and the available resources in multiple subframes are sorted according to an order from the frequency domain to the time domain, the available resources 0 to 8 as shown in FIG. 15. k=min(A, K), a value of A is defined in specification, e.g., A=10, K expresses the total number of the available resources in a subframe range [n+$c_{min}$, n+$d_{max}$). $c_{min}$ and $d_{max}$ are defined same as that in method 1A.

If $P_{pkt}$>i*P (if the determination condition configured above is $P_{pkt}$<i*P, the determination condition herein is $P_{pkt}$≥i*P), the UE randomly selects a resource from last k available resources between a subframe n+$c_{min}$ and a subframe n+$d_{max}$, a distance between a subframe where the resource is located and a subframe n is d, wherein the available resource is defined same as that in method 1A. Alternatively, the UE firstly determines a location of a reservation resource, and then randomly selects a resource from last k available resources between a subframe n+$c_{min}$ and a subframe n+$d_{max}$, a distance between a subframe where the resource is located and a subframe n is d, wherein the reservation resource and the available resource are defined same as than in method 1B.

So far, the embodiment ends. In the embodiment, an implementing order of blocks SS210 and SS220 is not changed. According to the method in the embodiment, it can be ensured that a size of the resource occupancy period and a size of the data packet generation period are as close as possible, so as to avoid that the resource is excessively reserved, or is not enough.

EMBODIMENT 10

In the embodiment, under the premise of satisfying a time delay requirement of a data packet, a UE firstly selects a subframe n+d of a resource of first data transmission, which satisfies that the number of times of occupying a same frequency resource is largest, collision among UEs is smallest, and/or, impact for a high priority UE is avoided; and then selects a resource occupancy period i*P according to a value of d, so that the UE can has the largest number of periods in which a same frequency resource is occupied. In the embodiment, before the resource is reselected, the resource occupancy period is not changed. The method includes procedures as follows.

At block SS301, a UE determines a subframe n+d of a resource for first data transmission.

In the embodiment, the UE randomly selects a resource from available resources between a subframe n+$c_{min}$ and a subframe n+$d_{max}$, a distance between the subframe where the resource is located and the subframe n is d, the available resource is defined same as that in method 1A of Embodiment 1. Alternatively, the UE firstly determines a location of a reservation resource between a subframe n+$c_{min}$ and a subframe n+$d_{max}$, and then randomly selects a resource in available resources, wherein a distance between the subframe where the resource is located and the subframe n is d, wherein the reservation resource and the available are defined same as that in method 1B of Embodiment 10.

At block SS320, the UE determines a frequency resource occupancy period i*P according to a value of d.

In a condition, if d≤floor(i*P/2), i=ceil($P_{pkt}$/P), wherein i*P is referred to as a minimum large period, and is expressed as $P_{ml}$, the same below. Otherwise, if d>floor(i*P/2), i=floor($P_{pkt}$/P), wherein i*P is referred to as a maximum small period, and is expressed as $P_{ms}$, the same below, wherein floor expresses round down to a nearest integer, and ceil expresses round up to a nearest integer.

In another condition, if d<floor(i*P/2), i=ceil($P_{pkt}$/P), wherein i*P is called as a minimum large period, and is expressed as $P_{ml}$, the same below. Otherwise, if d≥floor(i*P/2), i=floor($P_{pkt}$/P) wherein i*P is called as a maximum small period, and is expressed as $P_{ms}$, the same below.

So far, the embodiment ends. In the embodiment, an implementing order of blocks SS310 and SS320 cannot be changed. According to the method in the embodiment, the UE can randomly select the location of the resource for the first data transmission in a larger range, and it is conducive to reduce possibility of resource collision and IBE interference.

EMBODIMENT 11

In the embodiment, before a UE reselects a resource, a resource occupancy period may be changed. The UE firstly occupies a resource according to a minimum large period, uses a maximum small period once after every N periods, and then re-adjusts to the minimum large period. In the embodiment, in SA, the UE needs to indicate a value of N, a parameter Δ used to indicate that the maximum small period is used in some times of subsequently performing resource occupancy, and a value of the minimum large period $P_{ml}$. In detail, the method includes procedures as follows.

At block SS410, the UE determines a subframe n+d of a resource for first data transmission.

In the embodiment, the UE randomly selects a resource from available resources between a subframe n+$c_{min}$ and a subframe n+$d_{max}$, or randomly selects a resource from first k available resources between a subframe n+$c_{min}$ and a subframe n+$d_{max}$, a distance between a subframe where the resource is located and a subframe n is d, wherein the available resource is defined same as that in method 1A in Embodiment 9. Alternatively, the UE firstly determines a location of a reservation resource between the subframe n+$c_{min}$ and the subframe n+$d_{max}$, and then randomly selects a resource from available resources, or randomly selects a resource from first k available resources, a distance between the subframe where the resource is located and the subframe n is d, wherein the reservation resource and the available resource are defined same as than in method 1B in Embodiment 9. In addition, a value of d is not equal to integral multiple of asb(($P_{ml}$-$P_{pkt}$)-($P_{pkt}$-$P_{ms}$)), so as to avoid a location of the reservation resource and a generation location of a data packet is entirely overlapped, wherein abs(.) expresses an absolute value.

Alternatively, the UE may select the subframe n+d of the resource for the first data transmission according to another method.

At block SS420, the UE determines a frequency resource occupancy period i*P.

In the embodiment, after the resource is selected, a value of $i_j$ corresponding to a j-th resource occupancy period (refers to a distance between a j-th reservation resource and a (j−1)-th reservation/scheduling resource, wherein a location of a zero-th reservation/scheduling resource is n+d) is:

$$i_j = \begin{cases} \text{floor}(P_{pkt}/P), & \text{mod}(j, N) == 0 \\ \text{ceil}(P_{pkt}/P), & \text{other} \end{cases}$$

j=1, 2, . . . , J, J is defined in specification, or is indicated by a transmission UE, e.g., J=15, N=ceil(($P_{pkt}$−floor($P_{pkt}$/P))/(ceil($P_{pkt}$/P)−$P_{pkt}$))+1. In addition, the transmission UE needs to indicate N, Δ and a value of a minimum large period in SA, for scheduling the SA for data to be transmitted in the j-th reservation resource, Δ=N−mod(j, N), a value of the minimum large period $P_{ml}$ is ceil($P_{pkt}$/P). For the meaning of the term "reservation/scheduling resource", as shown in FIG. 16, a resource is scheduled through the SA for the data transmission this time, which is called as the scheduling resource; in addition, multiple resources are reserved through the SA for transmission of data packet subsequently generated, which are called as the reservation resources.

For a reception UE, if it is detected that a certain UE transmits the SA and the data transmission scheduled through the SA is located in some frequency resources in a subframe m, the reception UE considers to reserve a same frequency resource respectively in subframes m+$P_{ml}$×j−P×[floor(j/Δ)+floor((j−Δ)/N)], and avoid these occupied resources when performing resource selection.

Figure 16:
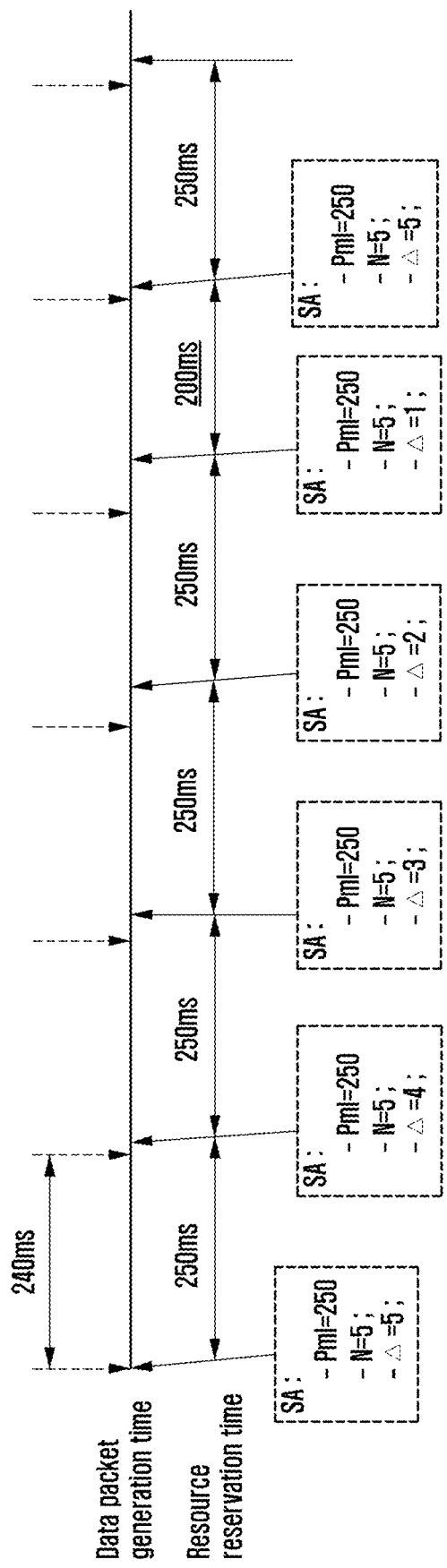
FIG. 16 is a schematic diagram according to Embodiment 11 of the present disclosure.

In FIG. 16, an example is taken, where $P_{pkt}$=240, P=50, $P_{ml}$=250, N=5, d=0.

So far, the embodiment ends. According to the method in the embodiment, the transmission UE has flexibility for scheduling the resource occupancy period, so as to increase the number of periods in which the UE occupies a same frequency resource. In addition, when the transmission UE only needs to indicate N, Δ and a minimum large period in the SA, the reception UE can determine the location of the reservation resource of the UE, thus, signaling overhead is low.

EMBODIMENT 12

In the embodiment, before a UE reselects a resource, a resource occupancy period may be changed. According to a generation location of a data packet, the UE selects a minimum large period or a maximum small period, so that a reservation resource exists in a time delay range after generating the data packet. In the embodiment, the UE needs to indicate whether the minimum large period or the maximum small period is used for a subsequent reservation resource through a bit map with a certain length in SA. The method includes procedures as follows.

At block SS510, the UE determines a subframe n+d of the resource for first data transmission.

In the embodiment, the UE may randomly select a resource from available resources between a subframe n+$c_{min}$ and a subframe n+$d_{max}$, or the UE may randomly select the resource from first k available resources in the subframe n+$c_{min}$ and the subframe n+$d_{max}$, wherein a distance between the subframe where the resource is located and a subframe n is d, wherein the available resource is defined as that in method 1A in Embodiment 9. Alternatively, the UE may firstly determine a location of a reservation resource between the subframe n+$c_{min}$ and the subframe n+$d_{max}$, and then randomly select a resource in available resources, or randomly select a resource from first k available resources, a distance between the subframe where the resource is located and the subframe n is d, wherein the reservation resource and the available resource are defined as that in method 1B in Embodiment 9. In addition, a value of d is more than zero, and is not equal to x*P−j*($P_{pkt}$−$P_{ms}$), so as to avoid that a location of the reservation resource and a generation location of a data packet are entirely overlapped, wherein j=1, 2, . . . , J, J is defined in specification, or is indicated by the transmission UE, e.g., J=5 or 15; x=1, 2, . . . , j.

Alternatively, the UE may select the subframe n+d of the resource for the first data transmission according to another method.

At block SS520, the UE determines a frequency resource occupancy period i*P.

In the embodiment, after the resource is selected, a value of $i_j$ corresponding to a j-th resource occupancy period (refers to a distance between a j-th reservation resource and a (j−1)-th reservation/scheduling resource, wherein a location of a zero-th reservation/scheduling resource is n+d) is:

$$P_{m,j}^{rsvp} = \begin{cases} \text{floor}(P_{pkt}/P), & T_{j-1} + \text{floor}(P_{pkt}/P) - P_{pkt} \times (j-1) \geq 0 \\ \text{ceil}(P_{pkt}/P), & \text{other} \end{cases}, \text{ or}$$

$$P_{m,j}^{rsvp} = \begin{cases} \text{ceil}(P_{pkt}/P), & T_{j-1} + \text{ceil}(P_{pkt}/P) - P_{pkt} \times (j-1) < M_{delay} \\ \text{floor}(P_{pkt}/P), & \text{other} \end{cases}$$

j=1, 2, . . . , J, J is defined in specification, or is indicated by the transmission UE, e.g., J=5 or 15, $T_{j-1}$ expresses time of the j-th reservation resource, $M_{delay}$ expresses maximum tolerable time delay of a current data packet, which is defined in specification. In addition, the UE needs to use a bit map with a length J to indicate periods used for subsequent J reservation resources, and a nominal resource occupancy period currently used $P_{nm}$, wherein the nominal resource occupancy period may be the minimum large period $P_{ml}$ or the maximum small $P_{ms}$. In particular, if a j-th bit is zero in the bit map, it expresses that a j-th resource occupancy period is equal to the nominal resource occupancy period indicated in the SA, or is $P_{nm}$−P (if $P_{nm}$=$P_{ml}$)/$P_{nm}$+P (if $P_{nm}$=$P_{ms}$); if the j-th bit is equal to 1 in the bit map, it expresses that the j-th resource occupancy period is $P_{nm}$−P (if $P_{nm}$=$P_{ml}$)/$P_{nm}$+P (if $P_{nm}$=$P_{ms}$), or is equal to the nominal resource occupancy period indicated in the SA.

For the reception UE, if it is detected that a certain transmission UE transmits the SA and the data transmission scheduled by the SA is on some frequency resources in a subframe m, without loss of generality, it is assumed that $P_{nm}$=$P_{ms}$, 0 in the bit map expresses that the resource occupancy period is equal to the nominal resource occupancy period indicated in the SA, 1 expresses that the resource occupancy period is $P_{nm}$+P, the reception UE considers that the transmission UE reserves a same frequency resource in a subframe $$m + \sum_{i=1}^{j} P_i,$$

and avoids the occupied resource when performing resource selection.

$$P_{l,j} \begin{cases} P_{nm}, & \text{if } l \text{ bit in bit map is 0} \\ P_{nm} + P, & \text{if } l \text{ bit in bit map is 1} \end{cases}.$$

Figure 17:
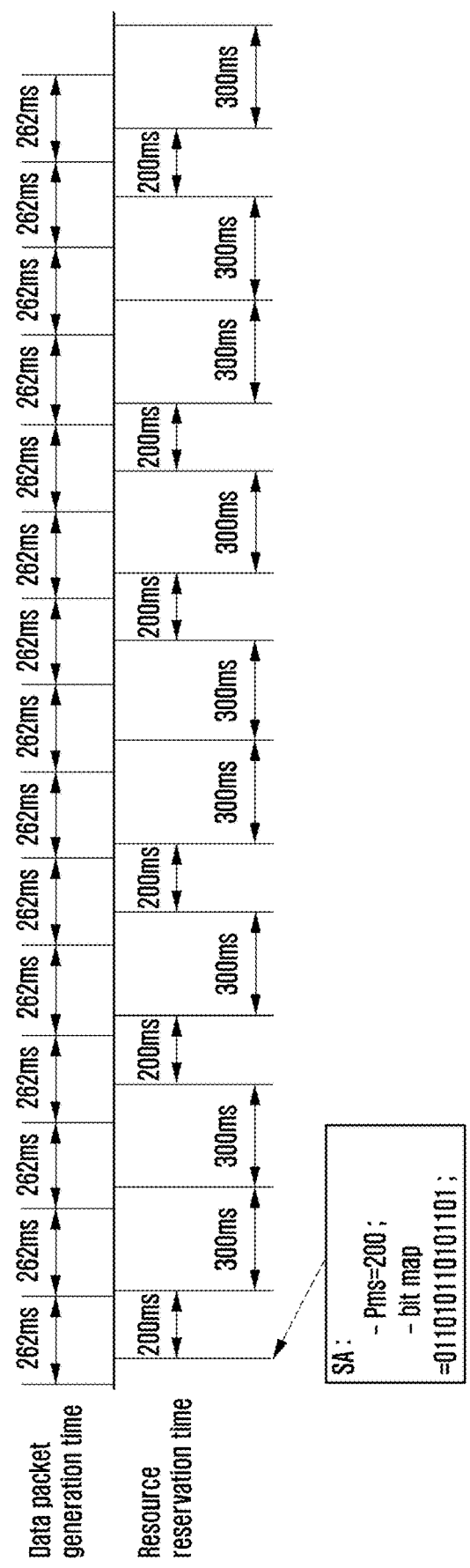
FIG. 17 is a schematic diagram according to Embodiment 12 of the present disclosure.

In FIG. 17, an example is taken, wherein $P_{pkt}$=262, P=100, $P_{ml}$=300, $P_{ms}$=200 and d=83.

If an interval between a generation location of a data packet and a location of a nearest reservation resource behind the generation location of the data packet is less than $d_{min}$, the UE may trigger resource reselection, or may drop transmission of the data packet this time. $d_{min}$ is defined in specification, e.g., $d_{min}=2_o$ So far, the embodiment ends. According to the method in the embodiment, the transmission UE has enough flexibility for adjusting the resource occupancy period, so that the UE can ensure the transmission time delay for each data packet. However, the transmission UE needs to indicate the resource occupancy period through the bit map in the SA, which needs signaling overhead.

EMBODIMENT 13

In the embodiment, before a UE reselects a resource, a resource occupancy period may be changed. According to a generation location of a data packet, the UE selects a minimum large period or a maximum small period, so that a reservation resource exists in a time delay range after generating the data packet. In the embodiment, the UE only indicates a nominal resource occupancy period $P_{nm}$ in the SA. For a reception UE, if it is detected that a certain UE transmits the SA and data transmission scheduled through the SA is on certain frequency resources in a subframe m, because a reception UE cannot exactly obtain the location of the reservation resource of the UE transmitting the SA, the reception UE may estimate a subframe range of the reservation resource according to a reservation period possibly used by the transmission UE, and the reception UE considers that the transmission UE reserves a same frequency resource in the subframe range. The method includes procedures as follows.

At block SS610, the UE determines a subframe n+d of a resource for first data transmission.

It is same with block SS510.

At block SS620, the UE determines a resource occupancy period i*P.

In the embodiment, after the resource is selected, a value of $i_j$ corresponding to a j-th resource occupancy period (refers to a distance between a j-th reservation resource and a (j−1)-th reservation/scheduling resource, wherein a location of a zero-th reservation/scheduling resource is n+d) is:

$$P_{m,j}^{rsvp} = \begin{cases} \text{floor}(P_{pkt}/P), & T_{j-1} + \text{floor}(P_{pkt}/P) - P_{pkt} \times (j-1) \geq 0 \\ \text{ceil}(P_{pkt}/P), & \text{other} \end{cases}, \text{ or}$$

$$P_{m,j}^{rsvp} = \begin{cases} \text{ceil}(P_{pkt}/P), & T_{j-1} + \text{ceil}(P_{pkt}/P) - P_{pkt} \times (j-1) < M_{delay} \\ \text{floor}(P_{pkt}/P), & \text{other} \end{cases}$$

j=1, 2, . . . , J, J is defined in specification, or is indicated by the transmission UE, e.g., J=5 or 15, $T_{j-1}$ expresses time of the j-th reservation resource, $M_{delay}$ expresses maximum tolerant time delay of a current data packet, which is defined in specification. In addition, the UE needs to indicate a nominal resource occupancy period currently used $P_{nm}$ in the SA, wherein the nominal resource occupancy period may be a minimum large period $P_{ml}$ or a maximum small period $P_{ms}$.

For the reception UE, if it is detected that a certain transmission UE transmits the SA, the data transmission scheduled by the SA is on certain frequency resources in a subframe m, if $P_{nm}=P_{ms}$, the transmission UE may use $P_{nm}$ or $P_{nm}+P$ for resource reservation, the reception UE considers that the UE reserves a same frequency resource in a subframe m+j*$P_{nm}$+l*P, and avoids the occupied resource when performing resource selection, wherein j=1,2 . . . , J, J is defined in specification, or is indicated by the transmission UE, e.g., J=5 or 15; l=0, 1, . . . , j.

For the reception UE, if it is detected that a certain UE transmits the SA, the data transmission scheduled by the SA is on certain frequency resources in a subframe m, if $P_{nm}=P_{ml}$, the transmission UE may use $P_{nm}$ or $P_{nm}-P$ for resource reservation, the reception UE considers that the transmission UE reserves a same frequency resource in a subframe m+j*($P_{nm}-P$)+l*P, and avoids the occupied resources when performing resource selection, wherein j=1,2, . . . , J, J is defined in specification, or is indicated by the transmission UE, e.g., J=5 or 15; l=0, 1, . . . , j.

If an interval between the generation location of the data packet and the location of the nearest reservation resource behind the location of the generated data packet is less than $d_{min}$, the UE may trigger resource reselection, or may drop the data packet transmission this time. $d_{min}$ is defined in specification, e.g., $d_{min}=2$.

So far, the embodiment ends. According to the method in the embodiment, the transmission UE has enough flexibility for adjusting the resource occupancy period, so that the UE can ensure the transmission time delay of each data packet. Further, the transmission UE only indicates the nominal resource occupancy period only in the SA, the reception UE may estimate the range where the transmission UE may reserve the resource according to the nominal resource occupancy period, thus, considers that the UE occupies a same frequency resource in each subframe in this range. According to the technical solution, a good compromise to signal overhead and resource utilization can be achieved.

EMBODIMENT 14

In the embodiment, a UE performs resource reselection when a specific trigger criterion is satisfied. When the resource reselection is performed each time, the UE may select $C_{Resel}$ resources, wherein $C_{Resel}$ may be more than 1, an interval between any two consecutive resources in the $C_{Resel}$ resources above, i.e., a resource occupancy period, may be different. When performing the resource reselection, the UE firstly determines a value of $C_{Resel}$, and then for a subframe where each resource assumed for the first data transmission is located (i.e., a subframe where each candidate resource for the first data transmission is located), determines ($C_{Resel}-1$) resource occupancy periods, and then selects the subframe where the resource for the first data transmission is located according to a channel sensing result. In the embodiment, in the SA, the UE indicates a location of a data resource currently scheduled, and at least indicates a value of a subsequent reservation period. The method includes procedures as follows.

At block SS710, the UE determines the resource occupancy period.

It is assumed that a subframe range of the resource for the first data transmission of the UE is [$T_1$, $T_2$], wherein $T_1$ and T2 are determined according to implementation of the UE, and $T_1 \leq 4$, $20 \leq T_2 \leq 100$, for any subframe m in the range, $T_1 \leq m \leq T_2$, the UE determines corresponding ($C_{Resel}-1$) resource occupancy periods $P_{m,j}^{reserve}$, wherein j=1, 2, . . . , $C_{Resel}-1$. For different m and j, a value of $P_{m,j}^{rsvp}$ may be different. In the embodiment, the UE may determine the value of $P_{m,j}^{rsvp}$ according to an implementing method of the UE, or may determine the value of $P_{m,j}^{rsvp}$ according to the following formula:

$$P_{m,j}^{rsvp} = \begin{cases} \text{floor}(P_{pkt}/P), & T_{j-1} + \text{floor}(P_{pkt}/P) - P_{pkt} \times (j-1) \geq 0 \\ \text{ceil}(P_{pkt}/P), & \text{other} \end{cases}, \text{ or}$$

$$P_{m,j}^{rsvp} = \begin{cases} \text{ceil}(P_{pkt}/P), & T_{j-1} + \text{ceil}(P_{pkt}/P) - P_{pkt} \times (j-1) < M_{delay} \\ \text{floor}(P_{pkt}/P), & \text{other} \end{cases}$$

$T_{j-1}$ expresses a location of a subframe for a (j−1)-th resource, $$T_{j-1} = \begin{cases} m, & j = 1 \\ m + \sum_{l=1}^{j-1} P_{m,l}^{rsvp}, & \text{other} \end{cases};$$

P expresses a minimum granularity of the resource occupancy period, a value of P is defined in specification, or is configured by eNB, e.g., P=100;

$P_{pkt}$ expresses a generation period of a data packet of the UE, a physical layer of a communication module of the UE obtains a value of $P_{pkt}$ through higher layer (e.g., an application layer) indication information.

$M_{delay}$ expresses maximum tolerant time delay of a current data packet, which is defined in specification, or is indicated by the application layer of the UE.

At block SS720, the UE determines a location of the subframe where the resource for the first data transmission is located.

A single subframe resource $R_{x,y}$ is defined as consecutive L PRBs in a subframe y starting from a PRB with an index x, wherein L is determined by implementation of the UE. According to a channel sensing result, the UE excludes a part of single subframe resources in the subframe range [$T_1$, $T_2$]. In particular, if the UE detects the SA transmitted by another UE in a certain pervious subframe, a data channel scheduled by the SA is within a subframe s, the frequency index of the PRBs occupied by the data channel is $PRB_0^{Rx}$, $PRB_1^{Rx}$, ... $PRB_{RM}^{Rx}$, wherein RM expresses the number of PRBs occupied by the data channel, and according to the SA, a same PRB in a subframe $s+P_s^{rsvp\_Rx}$ is reversed according to the reservation period $P_s^{rsvp\_Rx}$, according to an implementing method in the embodiment, if $s+P_s^{rsvp\_Rx}=m$, or $m+P_{m,1}^{rsvp}$ or $m+P_{m,1}^{rsvp}+P_{m,2}^{rsvp}$, ..., $$m + \sum_{l=1}^{C_{Reset}-1} P_{m,l}^{rsvp},$$

for a data channel scheduled by the SA, reception power measured on the subframe s by the UE is more than a threshold defined in specification, and the single subframe resource $R_{x,m}$ includes any one or more PRBs with indices $PRB_0^{Rx}$, $PRB_1^{Rx}$, ..., $PRB_{RM}^{Rx}$, the UE excludes $R_{x,m}$;

according to another implementing method in the embodiment, if $s+P_s^{rsvp\_Rx}=m$, or $m+j\times P^{rsvp}$, j=1, 2, ..., $A\times C_{Resel}-1$, and for the data channel scheduled by the SA, the reception power measured on the subframe s by the UE is more than a threshold defined in specification, the UE excludes $R_{x,m}$ if the single subframe resource $R_{x,m}$ includes any one or more PRBs with indices $PRB_0^{Rx}$, $PRB_1^{Rx}$, ..., $PRB_{RM}^{Rx}$, wherein $P_{rsvp}$ is a specific value defined in specification, or selected by the UE, e.g., $P^{rsvp}$ is equal to 100, A may be designated as 10, 6, or the UE selects a specific value between [1,10] as the value according to the implementing method of the UE.

It is assumed that a set of single subframe frequency resources excluded by the UE is $S_E$.

The UE selects a single subframe resource in subframe [$T_1$, $T_2$], where the single subframe resource is not included in $S_E$, a subframe where the single subframe resource is located is the subframe where the resource for the first data transmission is located. It is assumed that the single subframe resource selected by the UE is $R_{f,t}$, i.e., L PRBs in a subframe t starting from f, the UE may occupy a same PRB in a subframe $t+P_{t,j}^{reserv}$, wherein j=1, 2, ..., $C_{Resel}-1$. In the embodiment, the UE only indicates a reservation period in the SA, in particular, the UE indicates $P_{t,1}^{reserv}$ in SA for scheduling initial data transmission (a zero-th time) after resource selection, and indicates $P_{t,2}^{reserv}$ in SA for scheduling the first data transmission, and so on.

So far, the embodiment ends. According to the method in the embodiment, the UE only indicates one reservation period in the SA, which needs low signaling overhead, and reservation information can effectively improve channel selection quality of the UE, thus, in the technical solution, a good compromise to signal overhead and resource utilization can be achieved.

EMBODIMENT 15

In the embodiment, the UE performs resource reselection after a specific trigger condition is satisfied. When the resource reselection is performed each time, the UE may select $D_{Resel}$ resources according to a period $P^{rsvp}$, wherein $D_{Resel}$ is more than or equal to 1. The period $P^{rsvp}$ is a resource selection period to be considered when the UE performs the resource reselection, which is a specific value defined in specification or selected by the UE, e.g., $P^{rsvp}$ is equal to 100. When performing the resource reselection, the UE firstly determines the value of $D_{Resel}$, and selects the subframe where the resource for the first data transmission is located according to a channel sensing result. In the embodiment, in SA, the UE indicates a location of a data resource currently scheduled, and at least indicates a value of $P_{t,j}^{reserv}$ of a subsequent reservation period. When the UE performs multiple times of the data transmission after performing the resource selection once, the resource reservation periods indicated by the SA $P_{t,j}^{reserv}$ may be same or different. $P_{t,j}^{reserv}$ may be equal to $P^{rsvp}$, or may be different. The method includes procedures as follows.

At block SS810, the UE determines a location of a subframe for first data transmission.

It is assumed that a subframe range of the resource for the first data transmission is [$T_1$, $T_2$], wherein $T_1$ and $T_2$ are determined according to implementation of the UE, and $T_1 \leq 4$, $20 \leq T_2 \leq 100$, for each subframe m in the range, $T_1 \leq m \leq T_2$, the UE selects $D_{Resel}$ resources according to the period $P^{rsvp}$.

In the embodiment, a value of $P^{rsvp}$ may be 100, or the UE may select the value of $P^{rsvp}$ in [100,1000] with a granularity of 100 according to an implementing method of the UE. A value of $D_{Resel}$ may be directly determined according to the implementing method of the UE, or the UE firstly randomly selects an integer C in [5, 15], and then determines that $D_{Resel}=A\times C$, wherein A may be 10, 6, or the UE may select a specific value in [1, 10] according to the implementing method of the UE.

In particular, the UE may select $D_{Resel}$ resources according to the following way.

A single subframe resource $R_{x,y}$ is defined as consecutive L PRBs in a subframe y starting from a PRB with an index, wherein L is determined by implementation of the UE. According to a channel sensing result, the UE excludes a part of single subframe resources in the subframe range [$T_1$, $T_2$]. In particular, if the UE detects the SA transmitted by another UE in a certain pervious subframe, a data channel scheduled by the SA is within a subframe s, the frequency index of the PRBs occupied by the data channel is $PRB_0^{Rx}$, $PRB_1^{Rx}$, ... $PRB_{RM}^{Rx}$, wherein RM expresses the number of PRBs occupied by the data channel, and according to the SA, a same PRB in a subframe $s+P_s^{rsvp\_Rx}$ is reversed according to the reservation period $P_s^{rsvp\_Rx}$, if $s+P_s^{rsvp\_Rx}=m$ or $m+j\times P^{rsvp}$, $j=1, 2, \ldots, D_{Resel}-1$, it is only limited that j is a positive integer, and for the data channel scheduled by the SA, reception power measured in the subframe s by the UE is more than a threshold defined in specification, the UE excludes $R_{x,m}$ if the single subframe resource $R_{x,m}$ includes any one or more PRBs with indices $PRB_0^{Rx}$, $PRB_1^{Rx}$, ... $PRB_{RM}^{Rx}$. Alternatively, if a PRB set included in the single subframe resource $R_{x,m}$ is entirely same as a PRB set of the data channel scheduled by the SA, the UE excludes $R_{x,m}$ if the reception power of the data channel scheduled by the SA measured in the subframe s by the UE is more than a threshold defined in specification; If the PRB set included in the single subframe resource $R_{x,m}$ is not entirely same as the PRB set of the data channel scheduled by the SA, for the data channel scheduled by the SA, the processed reception power measured in the subframe s is compared with a threshold defined in specification, the UE excludes $R_{x,m}$ when the processed reception power is more than the threshold defined in specification. It is assumed that a set of the single subframe frequency resources excluded by the UE is $S_E$.

The UE selects a single subframe resource in a subframe range [$T_1$, $T_2$], wherein the single subframe resource is not included in $S_E$, the subframe where the single subframe resource is located is the subframe where the resource for the first data transmission is located. It is assumed that the single subframe resource selected by the UE is $R_{f,t}$, i.e., L PRBs in subframe t starting from f, the UE may occupy a same PRB in a subframe $t+j\times P^{rsvp}$, wherein $j=0, 1, \ldots, D_{Resel}-1$.

At block SS820, the UE determines a reservation period indicated in the SA, and transmits the SA and the data channel.

For data transmission of the UE each time, the reservation period for the data transmission next time is indicated in the SA. In particular, the UE indicates $P_{t,1}^{reserv}$ in SA for scheduling initial data transmission (a zero-th time) after resource selection, and indicates $P_{t,2}^{reserv}$ in SA for scheduling the first data transmission, and so on. The $P_{t,j}^{reserv}$ above is determined according to both the currently-generated data packet and $D_{Resel}$ resources selected according to the period $P^{rsvp}$. Especially, after performing the resource selection once, the resources occupied for multiple times of data transmission of the UE is a subset of the $D_{Resel}$ resources selected by the UE according to the period $P^{rsvp}$. So far, the embodiment ends. According to the method in the embodiment, the UE only indicate a reservation period in the SA, which needs little signaling bits, and the reservation information can effectively improve channel selection quality of the UE, thus, according to the technical solution, a good compromise to signaling overhead and system performance can be improved.

Figure 18:
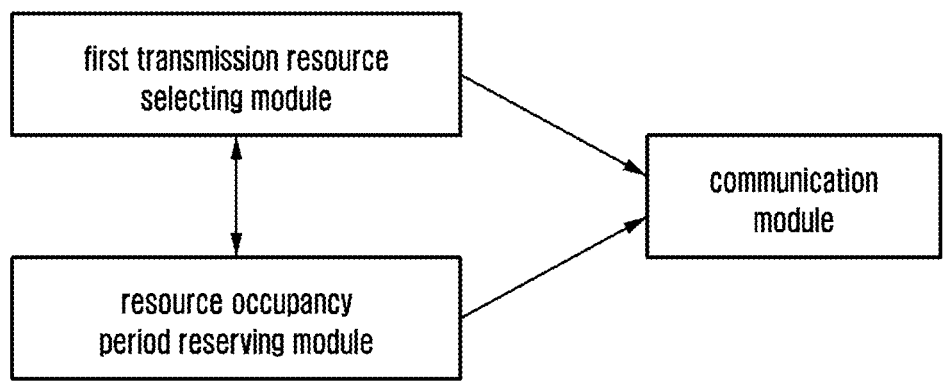
FIG. 18 is a schematic diagram illustrating a structure of an apparatus according to the present disclosure.

The present disclosure further provides a resource selecting apparatus in Vehicle to Everything (V2X) communication. A structure of the apparatus is as shown in FIG. 18, which includes a first transmission resource selecting module, a resource occupancy period reserving module, and a communication module.

The first transmission resource selecting module is to select a subframe where a resource for first data transmission is located; the resource occupancy period reserving module is to determine a resource occupancy period; and the communication module is to transmit a Scheduling Assignment (SA) for performing resource reservation.

It can be understood by a person of ordinary skill in the art that all of or a part of steps in the embodiment methods can be implemented by instructing related hardware by programs. The programs can be stored in a computer-readable storage medium, and, when executed, include one or a combination of the steps of the method embodiments.

In addition, each functional unit in each embodiment of the present disclosure can be integrated into a processing module; or each unit can exist alone physically; or two or more units can be integrated into one module. The integrated module can be implemented in the form of hardware, or can be implemented in the form of a software functional module. If the integrated module is implemented in the form of a software functional module and sold or used as an independent product, the integrated module can also be stored in a computer-readable storage medium.

The storage medium mentioned above can be a read-only memory, a magnetic disk, an optical disk, or more.

The forgoing description merely shows preferred embodiments of the present disclosure and is not intended to limit the present disclosure. Any modification, equivalent replacement or improvement made within the spirit and principle of the present disclosure shall fall into the protection scope of the present disclosure.

One of ordinary skill in the art would appreciate that all or a part of the steps of the methods in the foregoing embodiments may be implemented by a program instructing related hardware to carry out, and the program may be stored on a computer readable storage medium. When the program is executed, one of or a combination of the steps in the foregoing method embodiments is performed.

Further, the respective function units in the embodiments of the present disclosure may be integrated into one processing module, or may exist as separate physical units. Alternatively, two or more units may be integrated into one module. The above integrated module not only may be implemented with hardware, but also may be implemented with software function modules. If the integrated module is implemented as a software function module, and sold or used as an independent product, they may be stored on a computer readable storage medium.

The storage medium may be a read-only memory, a magnetic disk, an optic disk, and so on.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

What is claimed is:

1. A method for determining a resource of a communication by a terminal in a wireless communication system, the method comprising:
receiving, from a base station, information indicating a minimum number of subframes for monitoring;
determining a number of a plurality of subframes to be monitored based on the minimum number of subframes, the number of the plurality of subframes being greater than or equal to the minimum number of subframes for monitoring;
determining the plurality of subframes to be monitored in a predetermined time interval based on the determined number of the plurality of subframes to be monitored;
monitoring the plurality of subframes by measuring a sidelink-received signal strength indicator (S-RSSI) of a sidelink signal received in each of the plurality of subframes;
determining, among the plurality of subframes, a subframe to be included in a set of subframes for a sidelink transmission based on the S-RSSI measured in each of the plurality of subframes; and
transmitting, to an upper layer of the terminal, information indicating the set of subframes for the sidelink transmission.

2. The method of claim 1, further comprising:
receiving, from the base station, information configuring a partial sensing for the sidelink transmission.

3. A terminal for determining a resource of a communication in a wireless communication system, the terminal comprising:
a transceiver configured to transmit and receive signals; and
a controller coupled with the transceiver and configured to control to:
receive, from a base station, information indicating a minimum number of subframes for monitoring,
determine a number of a plurality of subframes to be monitored based on the minimum number of subframes, the number of the plurality of subframes being greater than or equal to the minimum number of subframes for monitoring,
determine the plurality of subframes to be monitored in a predetermined time interval based on the determined number of the plurality of subframes to be monitored,
monitor the plurality of subframes by measuring a sidelink-received signal strength indicator (S-RSSI) of a sidelink signal received in each of the plurality of subframes,
determine, among the plurality of subframes, a subframe to be included in a set of subframes for a sidelink transmission, based on the S-RSSI measured in each of the plurality of subframes, and
transmit, to an upper layer of the terminal, information indicating the set of subframes for the sidelink transmission.

4. The terminal of claim 3, wherein the controller is further configured to receive, from the base station, information configuring a partial sensing for the sidelink transmission.

5. A method for receiving information on a resource of a communication by a base station in a wireless communication system, the method comprising:
transmitting, to a terminal, information indicating a minimum number of subframes for monitoring; and
receiving, from the terminal, information indicating a set of subframes for a sidelink transmission, wherein the set of subframes for the sidelink transmission is determined based on the minimum number of subframes for monitoring,
wherein a subframe among a plurality of subframes is determined to be included in the set, based on a sidelink-received signal strength indicator (S-RSSI) measured in each of the plurality of subframes, and
wherein the plurality of subframes are determined based on a number of the plurality of subframes that is greater than or equal to the minimum number of subframes for monitoring.

6. The method of claim 5, further comprising:
transmitting, to the terminal, information configuring a partial sensing for the sidelink transmission.

7. A base station for receiving information on a resource of a communication in a wireless communication system, the base station comprising:
a transceiver configured to transmit and receive signals; and
a controller coupled with the transceiver and configured to control to:
transmit, to a terminal, information indicating a minimum number of subframes for monitoring, and
receive, from the terminal, information indicating a set of subframes for a sidelink transmission,
wherein the set of subframes for the sidelink transmission is determined based on the minimum number of subframes for monitoring,
wherein a subframe among a plurality of subframes is identified to be included in the set, based on a sidelink-received signal strength indicator (S-RSSI) measured in each of the plurality of subframes, and
wherein the plurality of subframes are identified based on a number of the plurality of subframes that is greater than or equal to the minimum number of subframes for monitoring.

8. The base station of claim 7, wherein the controller is further configured to transmit, to the terminal, information configuring a partial sensing for the sidelink transmission.

* * * * *